INVENTORS
HERBERT W. VOLKER
JAMES A. McDONALD
BY Cromwell, Greist & Warden
ATTYS.

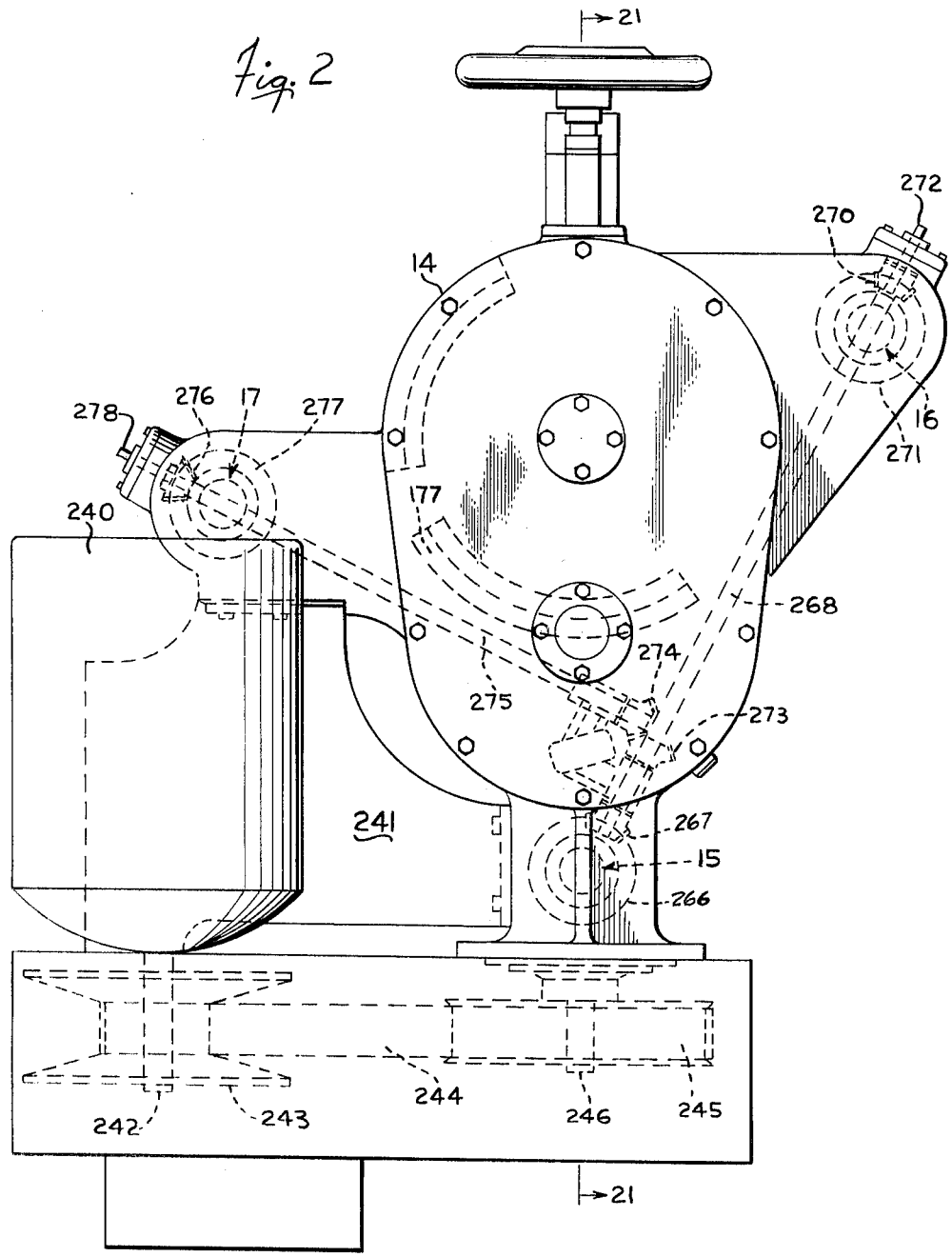

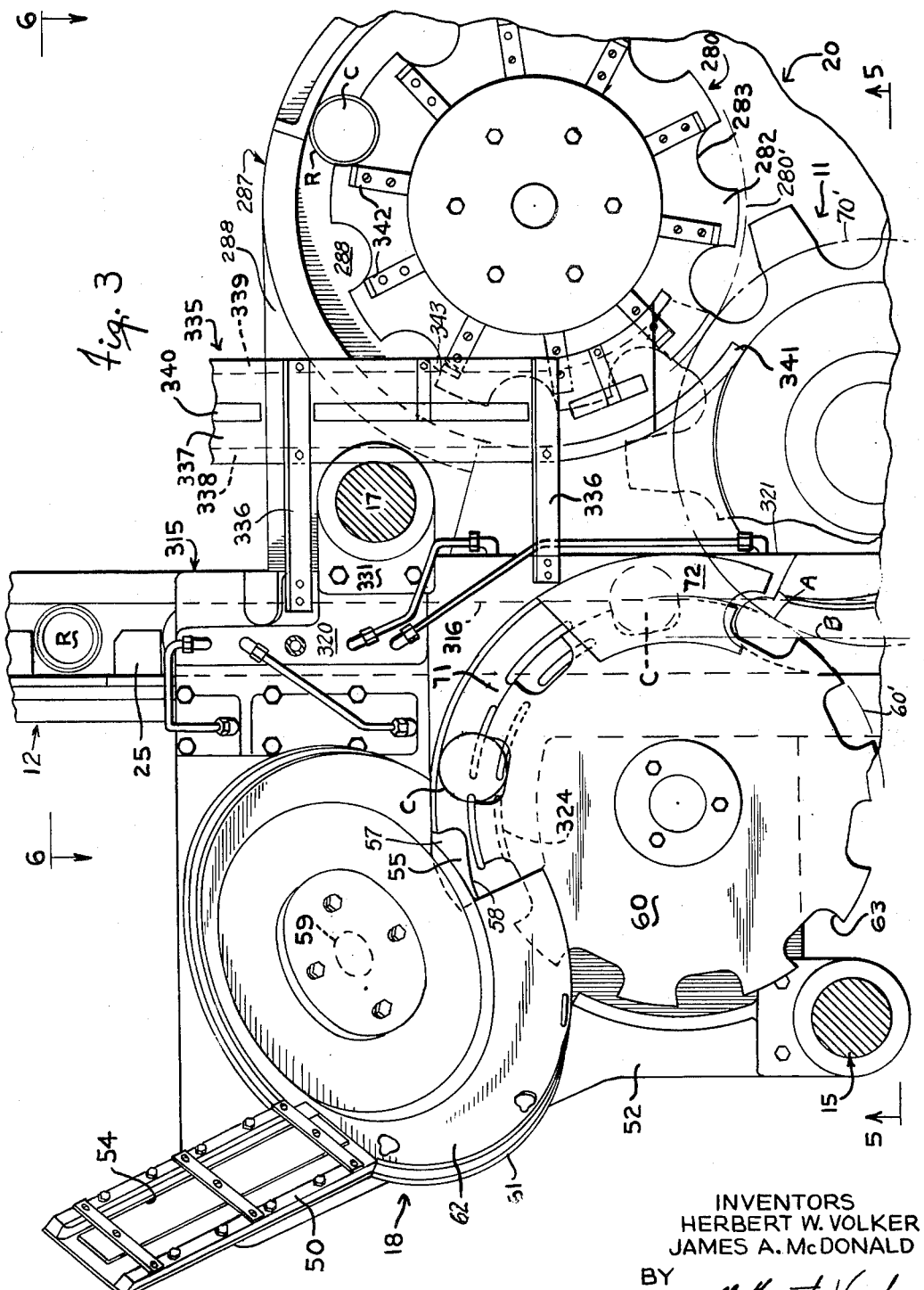

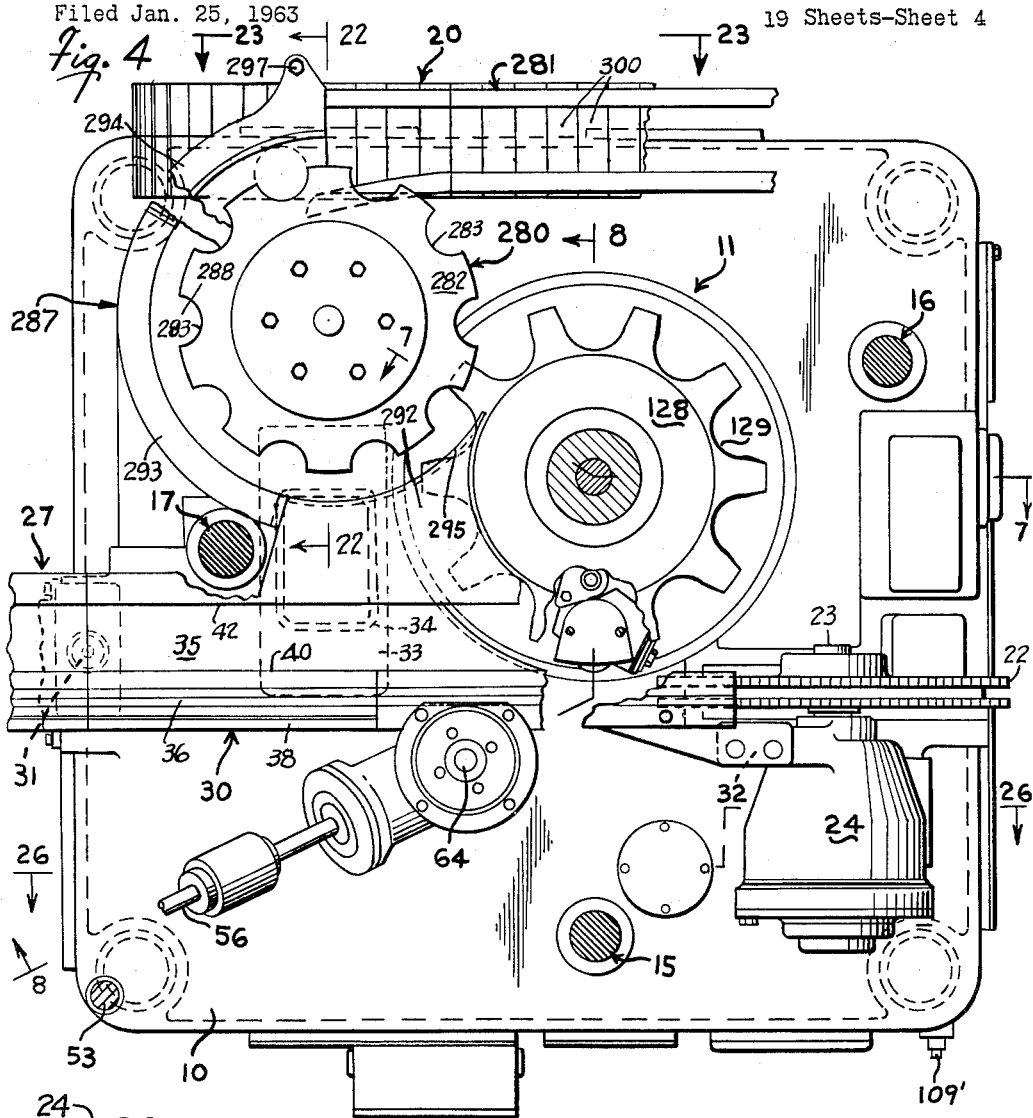
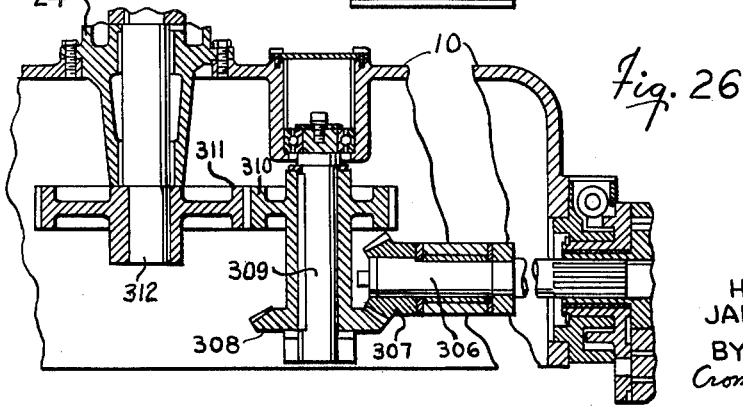

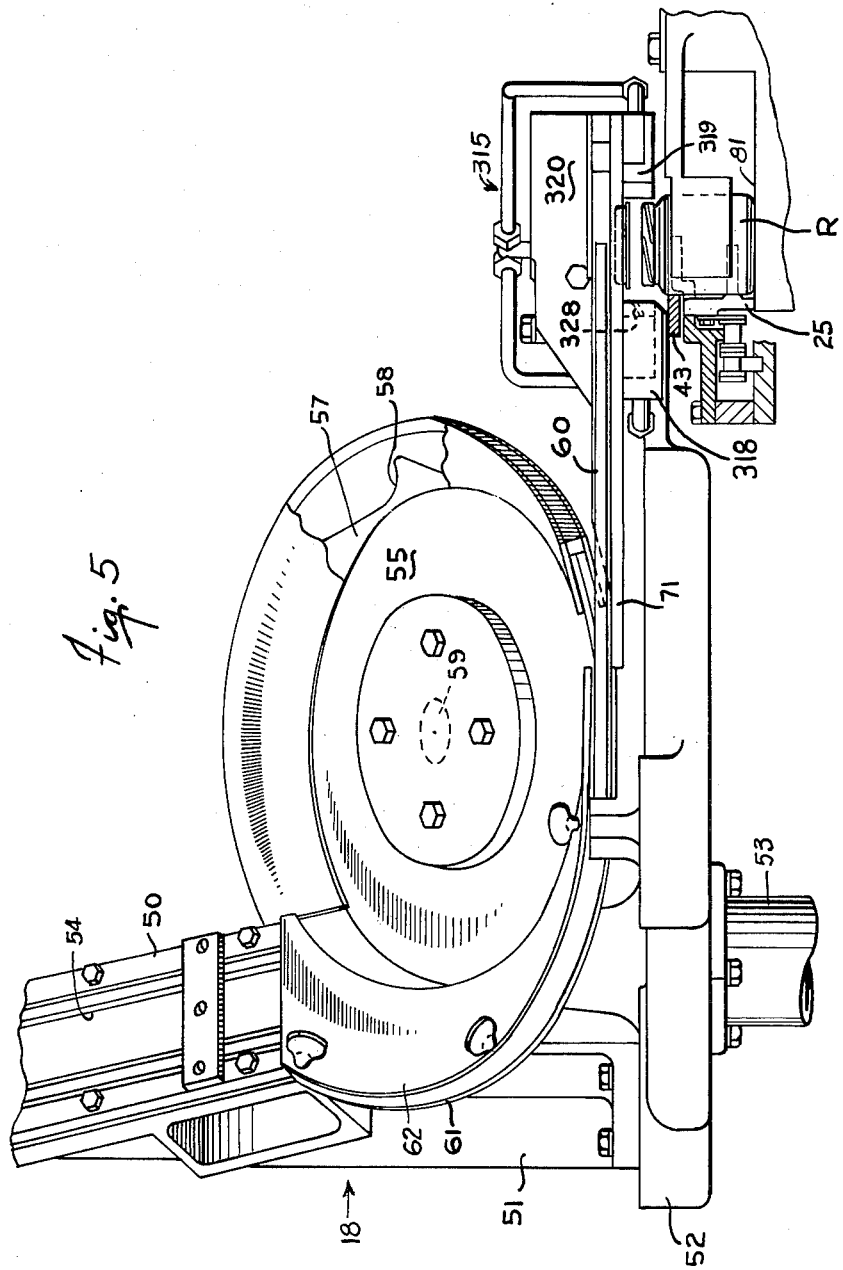

May 31, 1966  H. W. VOLKER ETAL  3,253,388
ROTARY JAR CAPPING MACHINE
Filed Jan. 25, 1963  19 Sheets-Sheet 6
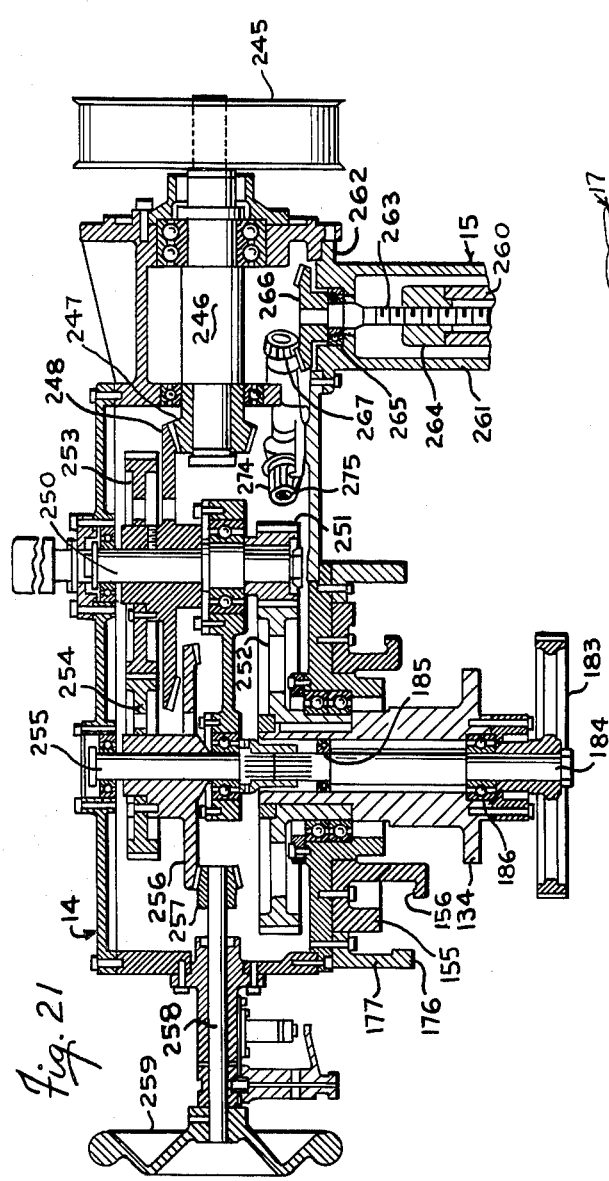
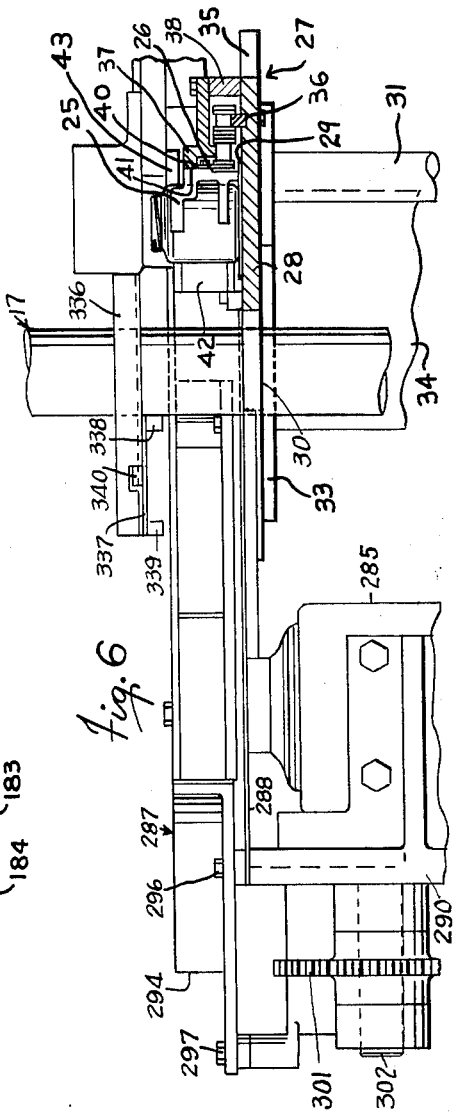
INVENTORS
HERBERT W. VOLKER
JAMES A. McDONALD
BY Cromwell, Greist, Warden
ATTYS.

INVENTORS
HERBERT W. VOLKER
JAMES A. McDONALD
BY
Cromwell, Greist & Warden
ATTYS.

May 31, 1966 H. W. VOLKER ETAL 3,253,388
ROTARY JAR CAPPING MACHINE
Filed Jan. 25, 1963 19 Sheets-Sheet 13

INVENTORS
HERBERT W. VOLKER
JAMES A. McDONALD

BY Cromwell, Greist & Warden
ATTYS.

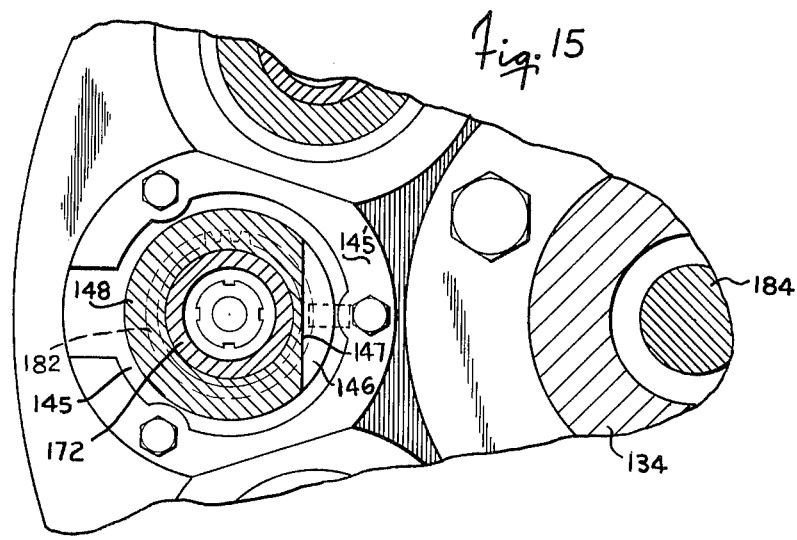
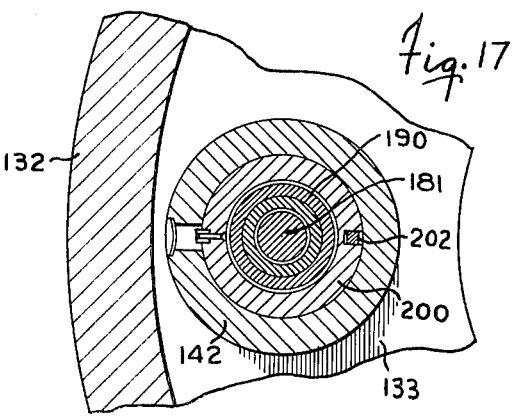
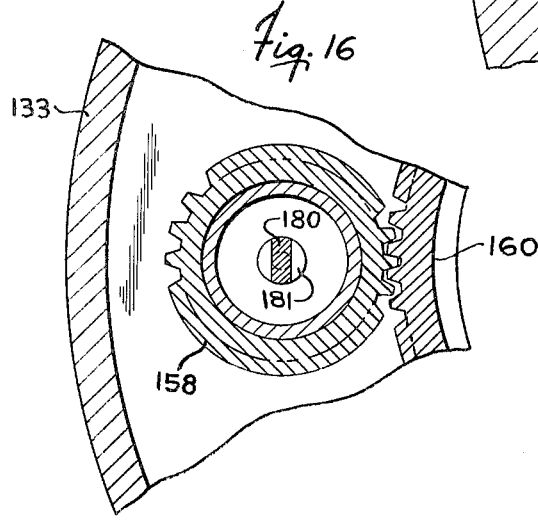

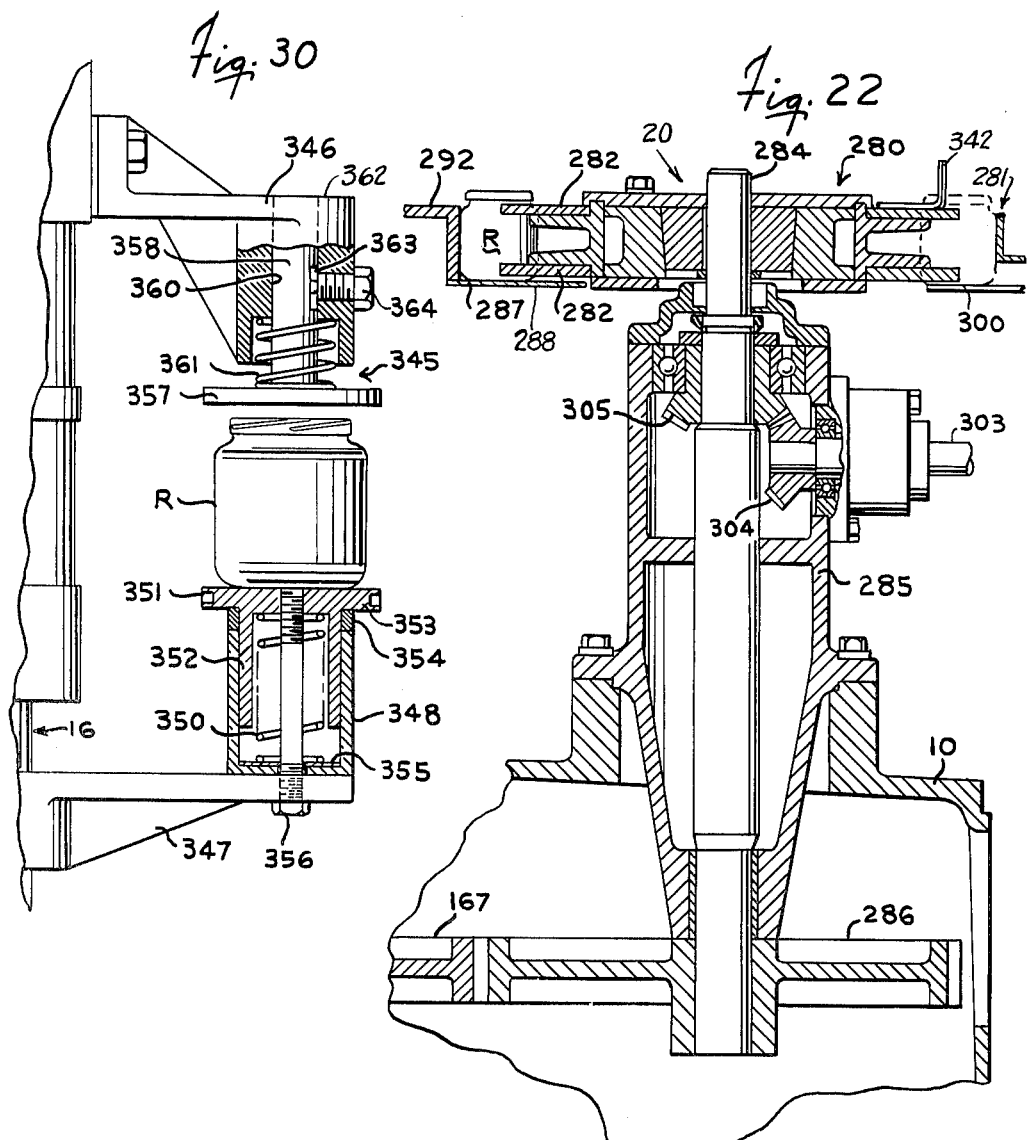

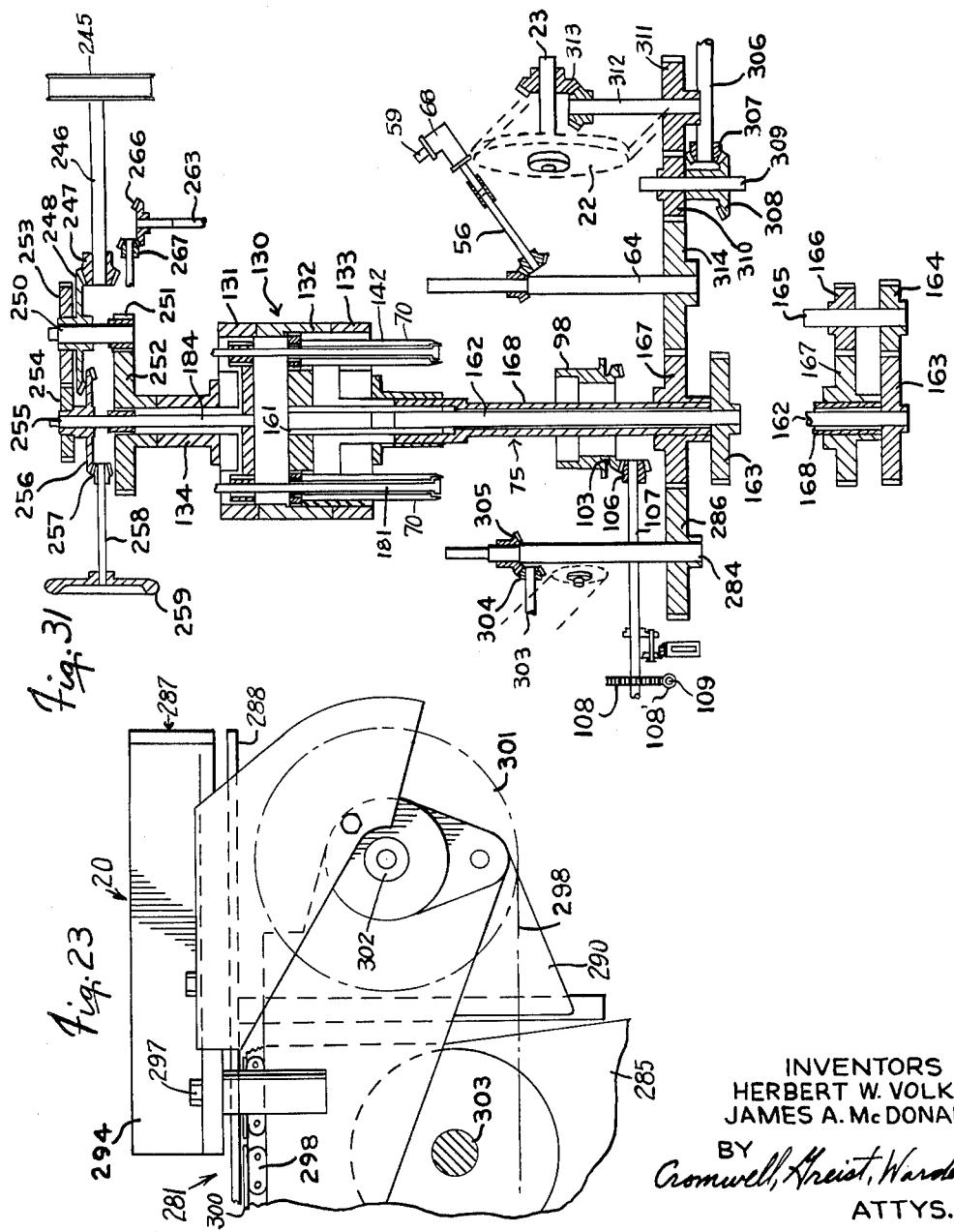

May 31, 1966   H. W. VOLKER ETAL   3,253,388
ROTARY JAR CAPPING MACHINE
Filed Jan. 25, 1963   19 Sheets-Sheet 17
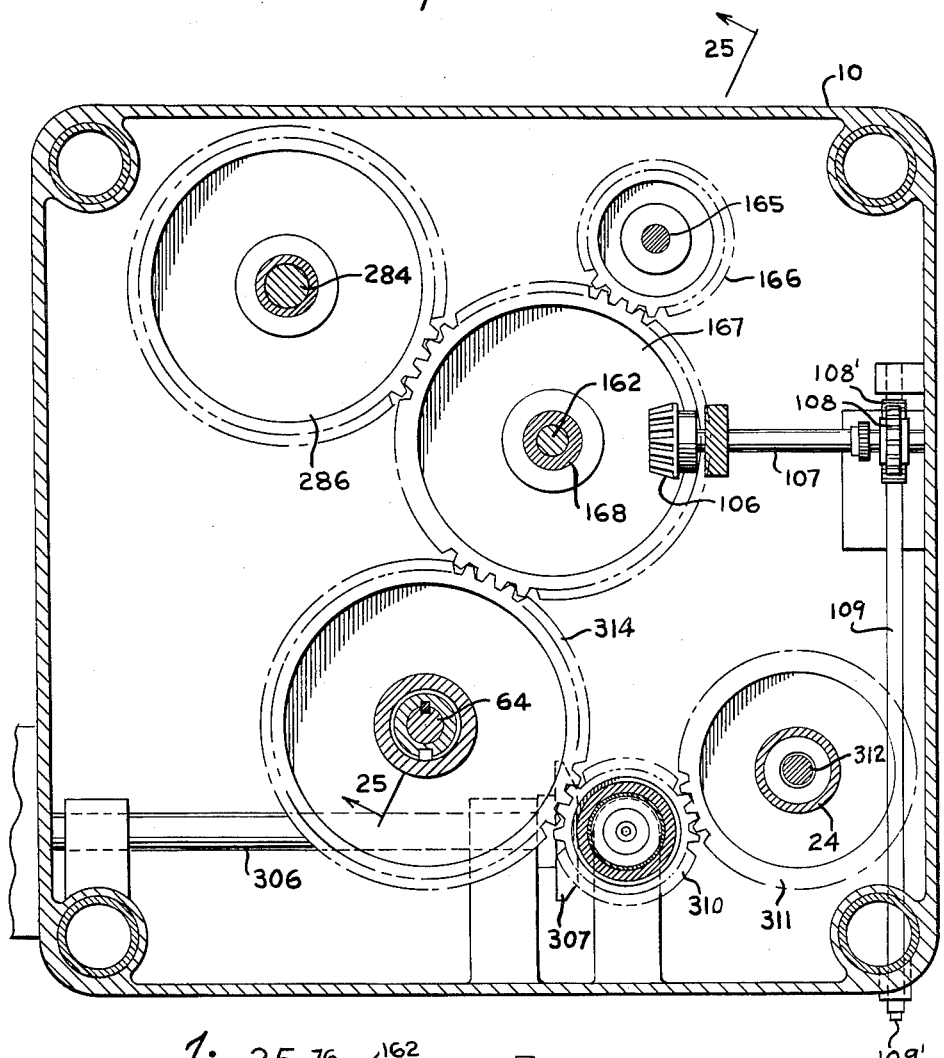
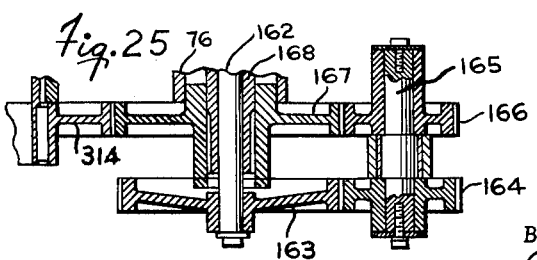
INVENTORS
HERBERT W. VOLKER
JAMES A. McDONALD
BY
Cromwell, Greist + Warden
ATTYS.

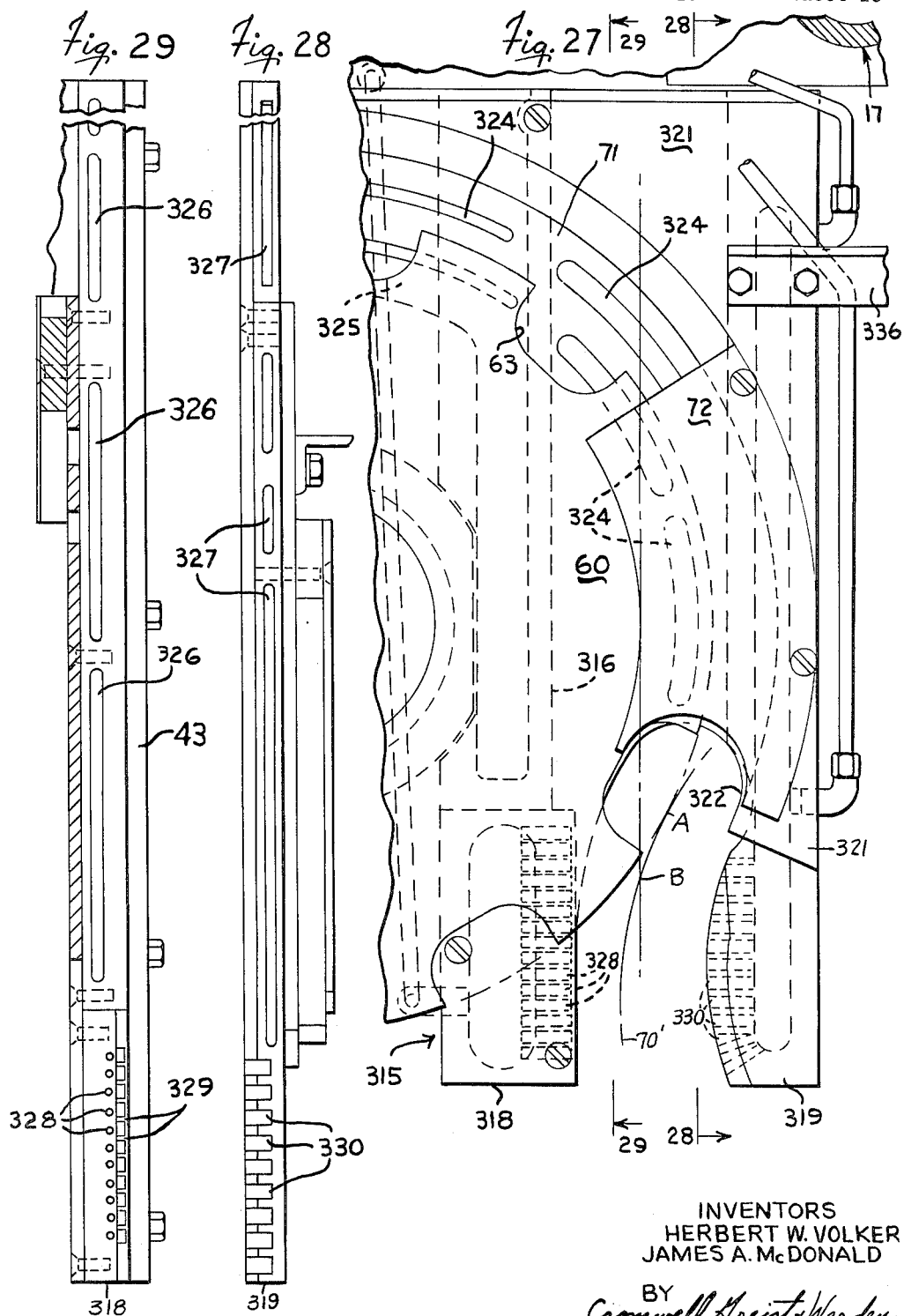

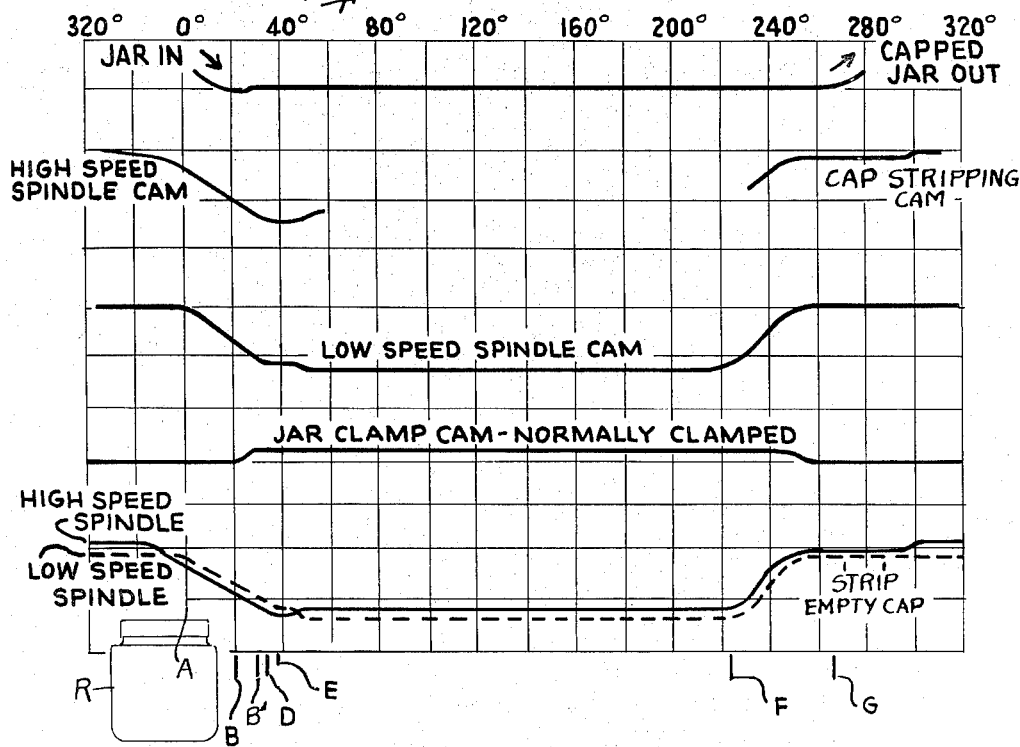
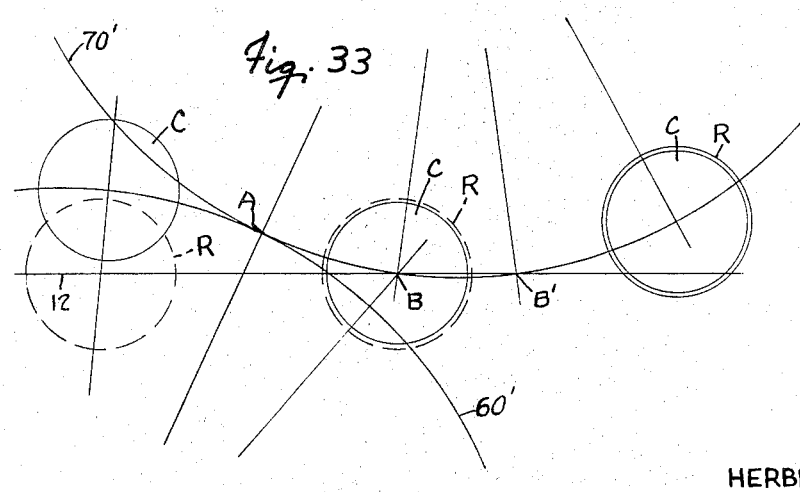

United States Patent Office 3,253,388
Patented May 31, 1966

3,253,388
ROTARY JAR CAPPING MACHINE
Herbert W. Volker, Naperville, and James A. McDonald, South Oaklawn, Ill., assignors to Continental Can Company, Inc., New York, N.Y., a corporation of New York
Filed Jan. 25, 1963, Ser. No. 253,895
30 Claims. (Cl. 53—303)

This invention relates to machinery for applying closures to containers and is more particularly concerned with improvements in a machine for automatically applying screw-on or turn-on closure caps to the tops of jars or similar containers and turning the caps into tight sealing relation on the jar.

In the commercial processing and packaging of food products and other commodities in glass jars or similar containers with which screw threaded caps are used for closing and sealing the containers, various types of cap applying and closing machinery has been employed. Some of these machines place the caps on the containers and thereafter rotate the caps to turn them down to sealing position while the containers are traveling through the machine. In one such machine which has been employed, the filled containers are delivered on a straight line conveyor to a turret which carries the containers in a circular path while the caps are placed thereon and screwed down to sealing position with the capped containers being transferred from the turret to another straight line conveyor which removes them from the machine. In this type of machine, the caps are applied and rotated into screwed down sealing position by a series of cap applying and sealing head or spindle assemblies which are mounted on the turret and which travel with the jars as they move in a circular path about the same. Previously, in the design of this type machine it has been found necessary to provide a relatively large turret and a large number of cap applying and turning spindle assemblies because of the time required for the operation of the spindle assemblies and to maintain the desired rate of travel of the jars so as to permit the capping machine to be placed in the processing line without reducing the speed of operation of the jar filling and other equipment. A general object of the present invention is to provide an improved cap applying machine of this type which employs a relatively small turret with a small number of cap applying heads or spindles and which is nevertheless capable of high speed operation.

It is a more specific object of the invention to provide a rotary cap applying machine having a turret for receiving filled jars from a processing line and a relatively small number of spindles traveling with the turret which are operable for high speed application and rotation of the caps into sealing position and with provision for tightening the caps on the jars at a slower speed under conditions which permit accurate control of the tightening force on the cap so as to apply the caps to successive jars with a uniform torque.

Another object of the invention is to provide a rotary jar capping machine wherein the jars are delivered to the machine in a straight line and continue on a straight line path until they intersect the pitch diameter of the sealing turret in a chordal path with the cap being placed on the jar and turned into engagement with the screw threads before the jar has left its straight line path so as to seat the cap fully on the jar as the jar enters the circular path and before the jar is subject to sufficient centrifugal force to cause the contents to spill out of the jar top.

It is a further object of the invention to provide a rotary jar capping machine wherein the jars are delivered to a rotating turret on which the caps are applied and turned down into sealing relation by heads carried on the turret with the caps being delivered to the sealing heads and carried in a circular path while they are placed on the jar top and engaged with the screw threads thereon, and with the jars being advanced at the point of entry to the turret on a straight path while the cap is being applied and screwed down, and with the caps being tightened by slow rotation while the jars are carried in a circular path by the turret with the cap and the jar at all times under full control of the machine and with the capped jar quickly released for rapid delivery from the turret to a straight line discharge conveyor.

Another object of the invention is to provide in a rotary type jar capping machine a turret on which the jars are supported while the caps are applied and associated capping heads which include independently driven spindles for applying the cap to the jar and rotating it into seated position and for thereafter tightening the cap into sealing relation.

A still further object of the invention is to provide a rotary jar capping machine having cap applying and turning heads mounted on a jar supporting turret with the heads each having two independently driven spindles, one of the spindles to which the cap is initially delivered being rotated at high speed for placing the cap on the jar and rotating the same into fully engaged position and the other spindle being operated at a relatively low speed so as to engage the cap and tighten it to a preset torque with the jar being gripped on the turret so as to hold it against rotation during the capping operations of the spindles.

It is a still further object of the invention to provide a multiple station rotary jar capping machine of the type described in which the jar is under vertical pressure during the final turning of the cap thereon with provisions for adjusting the pressure simultaneously at all the stations while the turret is rotating.

Another object of the invention is to provide in a rotary type jar capping machine a turret having multiple stations at which the jars are supported while the caps are applied and turned into sealing relation with the turret having jar clamps at each station thereupon comprising cooperating stationary and pivotally mounted arms which are urged toward a closed position by a spring which is adjustable for various pressures and opened by a cam operating against the force of the spring for receiving or releasing the jars.

A further object of the invention is to provide a jar capping machine for vapor vacuum sealing which employs a system for steaming the cap and the jar with low velocity and high volume steam as the cap is positioned above the mouth of the jar and lowered to a point approximately one-sixteenth inch above the jar where a sheet of high velocity steam is directed downwards on a shallow angle and a plurality of high velocity steam jets are directed upwardly to blow steam under the cap immediately prior to the seating of the cap on the jar mouth.

It is a further object of the invention to provide an automatic rotary type capping machine which is adapted to mechanically turn or spin a closure cap into its proper position on the mouth of a glass jar which machine operates more efficiently and with greater speed than any prior machine of the rotary type, which is provided with various safety devices to prevent damage to the machine and the product which it is handling, and which can be constructed more economically than machines of this type previously provided.

These and other objects and advantages of the invention will be apparent from a consideration of the rotary cap applying machine which is shown by way of illustration in the accompanying drawings wherein:

FIGURE 2 is a top plan view of the machine, to an enlarged scale;

FIGURE 3 is a horizontal section taken on the line 3—3 of FIGURE 1, to an enlarged scale and with portions broken away;

FIGURE 4 is a horizontal section taken on the line 4—4 of FIGURE 1 to an enlarged scale, with portions being broken away and with other portions being omitted;

FIGURE 5 is a partial vertical section taken on the line 5—5 of FIGURE 3, to an enlarged scale;

FIGURE 6 is a partial vertical section taken on the line 6—6 of FIGURE 3;

FIGURE 15 is a fragmentary horizontal section taken on the line 15—15 of FIGURE 12, to a larger scale;

FIGURE 16 is a fragmentary horizontal section taken on the line 16—16 of FIGURE 12, to a larger scale;

FIGURE 17 is a fragmentary horizontal section taken on the line 17—17 of FIGURE 12, to a larger scale;

FIGURE 18 is a fragmentary horizontal section taken on the line 18—18 of FIGURE 12, to a larger scale;

FIGURE 19 is a fragmentary horizontal section taken on the line 19—19 of FIGURE 12, to a larger scale;

FIGURE 20 is a fragmentary horizontal view taken on the line 20—20 of FIGURE 12, to a larger scale;

FIGURE 21 is a partial vertical section at the top of the machine, the view being taken on the line 21—21 of FIGURE 2;

FIGURE 22 is a partial vertical section, taken on the line 22—22 of FIGURE 4;

FIGURE 23 is a vertical view, taken on the line 23—23 of FIGURE 4, to an enlarged scale;

FIGURE 24 is a horizontal section taken on the line 24—24 of FIGURE 1, to an enlarged scale;

FIGURE 25 is a vertical section taken on the line 25—25 of FIGURE 24, with portions broken away;

FIGURE 26 is a partial vertical section, taken on line 26—26 of FIGURE 4, to an enlarged scale and with portions broken away;

FIGURE 27 is a fragmentary horizontal view, taken on the same plane as FIGURE 3, to a larger scale, showing particularly the vapor vacuum apparatus;

FIGURE 28 is a fragmentary vertical section taken on the line 28—28 of FIGURE 27;

FIGURE 29 is a fragmentary vertical section, taken on the line 29—29 of FIGURE 27;

FIGURE 30 is a fragmentary vertical view, partly in section, showing the gauge apparatus for adjusting the height of the cap applying head and the vertical pressure on the cap and jar assemblies;

FIGURE 31 is a schematic view showing the drive mechanism for the machine;

FIGURE 32 is a timing diagram; and

FIGURE 33 is a diagrammatic view illustrating the movements of the caps and jars at the cap applying station.

Figure 1:
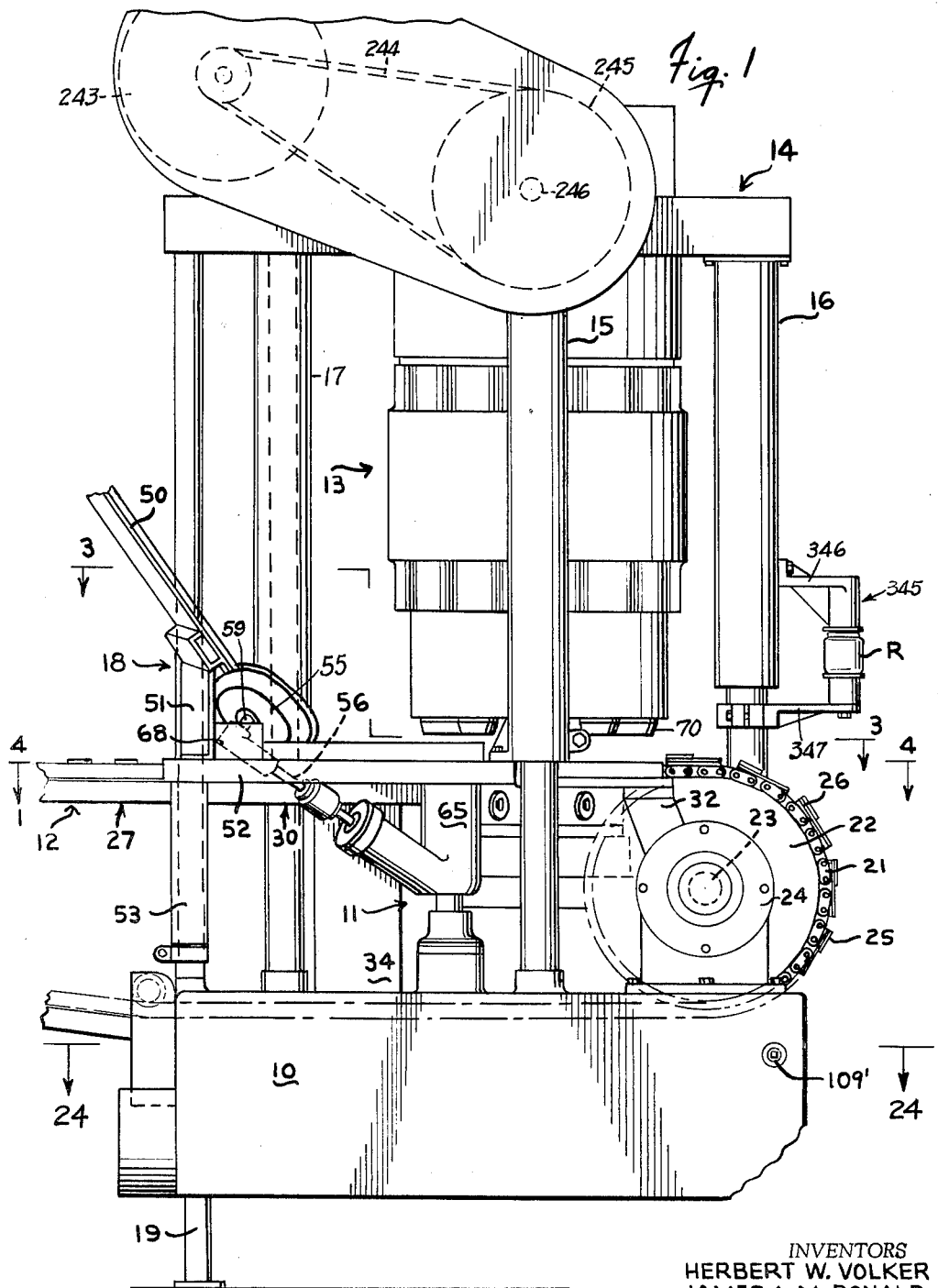
FIGURE 1 is a side elevation of a rotary jar capping machine which embodies therein the principal features of the invention, portions of the machine being broken away or omitted.

The machine which is illustrated in the drawings is adapted to form part of a canning or processing line and is designed to apply screw-on or turn-on type closure caps C to containers or receptacles, such as glass jars R, which have been filled with a product and delivered to a traveling conveyor which constitutes the jar infeed apparatus for the capping machine.

The capping machine comprises a base support 10 (FIGURES 1 and 4) which houses the major portion of the driving gear mechanism and which supports a jar carrying turret 11 to which the jars R are delivered by the infeed conveyor 12. The jar carrying turret 11 is disposed below a cap applying head 13 which is suspended from a top drive housing 14, with the latter being mouned in vertically adjustable position on three main post assemblies 15, 16 and 17, which post assemblies are upstanding from the base 10 and arranged generally in triangular relation on the base 10. A cap feeding and delivering or transfer apparatus 18 is also supported on the base 10 at one side of the jar supporting turret 11 at the proper level for delivering caps C from a supply magazine or chute to the applying head 13 while the jars R are delivered to the turret 11 for alignment of the caps and jars and the application of the caps to the jars which is accomplished before the jars are transferred from the straight line path of the conveyor 12 to the circular path traversed by the turret 11. The caps C are applied to the jars R, tightened during rotation of the turret 11 and the head 13, and the capped jars are delivered to a discharge mechanism 20 (FIGURE 4) which removes them from the machine, there being, of course, a continuous flow of the jars R and caps C through the machine while it is operating.

The jar infeed conveyor 12 comprises an endless double chain carrier 21 (FIGURES 1, 4, 6 and 8) which has one end supported on a double plate sprocket 22 mounted on a stub shaft 23 journaled in an upstanding housing 24 on the base 10. The upper run of the conveyor 12 which feeds the jars R into the machine is in a generally horizontal plane at the proper elevation above the base 10 to deliver the jars to the jar supporting or carrying turret 11. The return run of the conveyor passes from the sprocket 22 across the base 10, through an opening in the side wall of the base and back to the other end support (not shown) for the conveyor 12. The chain 21 carries a series of U-shaped jar forwarding or pusher members 25, each of which is attached to the chain 21 by a vertically extending link plate 26 so that it is open on the side facing the turret 11. The upper run of the jar infeed conveyor 12, as it approaches the machine, is carried on a chain guiding and jar support structure indicated at 27 (FIGURES 1, 4 and 6) which includes a horizontally disposed bottom plate 28 and wear plate 29 on the top thereof on which the jars R and pushers 25 slide. As the chain 21 moves into the capping machine, the chain 21 and the jars R are supported and guided on a suitable frame structure or guide assembly 30 which is supported at one end on the top of a vertical post 31 which extends above the base 10. The post 31 also supports the end of the conveyor frame structure 27. At its other end the guide assembly 30 is attached to an upstanding bracket 32 on the gear housing 24. The guide assembly 30 is supported intermediate its ends on a flat plate 33 on the top of an upstanding column 34 on the base 10. The guide assembly 30 comprises a horizontally disposed base plate 35 which is aligned with the bottom plate 28 of the infeed conveyor support frame 27 and the wear plate 29 on which the bottoms of the jars rest as they are advanced by the movement of the chain 21. The chain 21 is guided by a longitudinally extending rail 36 which is set in the base plate 35 and support frame 27 and guides the chain 21 in a horizontal straight line across the machine. A guide member 37 for the jar pushers 25 is mounted in spaced relation above the bottom plate 35 and secured on a vertically disposed wall member 38 which extends along the outside edge of the base plate 35. The guide member 37 is generally L-shaped in section with a rail forming flange 40 on which the flanges 41 on the pusher members 25 ride, guiding them in a vertically straight path. A vertically disposed wall member 42 is mounted in spaced relation opposite the guide rail 40 and provides one side of a guideway of the proper width for the jars R, the other side of the guideway being a rail member 43 extending along a steam chamber, which is hereinafter described, above the guide assembly 30. The guide assembly 30 extends to the turret 11 and the ends of the several guide members of the assembly are cut away or recessed adjacent the edge of the turret to clear the turret and permit rotation of the turret and operation of jar gripping devices or assemblies 45 (FIGURE 9) on the turret which pick up the jars R from the infeed pusher members 25.

The caps C are supplied to the machine by the cap supplying and feeding mechanism 18 (FIGURES 1, 3 and 5) from a magazine or other supply source (not shown) through a cap feed chute 50 which is supported in upwardly inclined relation by a bracket 51 extending upwardly from a horizontal support or base plate 52 which is connected by suitable brackets to the main post assemblies 15 and 17 and a supplemental vertical post 53 (FIGURES 1, 4 and 5) at the one corner of the base 10. The cap feed chute 50 is constructed to provide a guideway 54 for delivering the caps C in a continuous stream to a feed wheel 55 which is mounted in inclined position at the bottom or delivery end of the chute 50. The feed wheel 55 is supported on the top end of an inclined shaft 59 (FIGURES 1, 3 and 5) and is provided with a flange forming portion 57 having peripherally spaced, relatively shallow pockets 58 for receiving caps from the chute 50 and for advancing individual caps, one at a time, in regular succession to a transfer wheel 60. The flange 57 is inclined relative to the plane in which the feed wheel turns so that at the lowermost point of travel the flange 57 is parallel with the horizontally disposed base plate 52 and the caps are brought into a horizontal position for pick up by the transfer wheel 60. A guard rail or guideway forming assembly comprising a bottom cap supporting plate 61 and a top cover plate 62 extends from the bottom end of the feed chute 50 to the point of delivery of the caps to the transfer wheel 60, the two plates 61 and 62 being curved to conform to the path of the flange 57. The flange 57 advances the caps C between the top and bottom guide plates 61 and 62 of the guideway assembly to a point where the caps are seated in one of the pockets 63 on the transfer wheel 60.

The transfer wheel 60 is mounted on the top end of a vertically disposed drive shaft 64 (FIGURE 8) which has its upper end journaled in the vertically disposed leg of a V-shaped housing 65 depending from the support plate 52. The drive shaft 64 carries a bevel pinion 66 which engages with a bevel gear 67 on the lower end of the inclined shaft 56, the latter being mounted in suitable bearings in the upwardly inclined other leg of the housing 65. The inclined shaft 56 (FIGURE 1) has a right angled gear drive connection at 68 with the shaft 59 on which the cap feed wheel 55 is supported so that the cap feed wheel 55 and the cap transfer wheel 60 are driven in synchronism by the drive shaft 64.

The caps C are picked up by the transfer wheel 60 and fed to a make up point A (FIGURE 3) where they are delivered beneath one of a plurality of cap applying spindle assemblies 70 (FIGURE 12) carried on the cap applying head 13. The spindle assemblies are moved by rotation of the head 13 to a make up point B where each successive spindle assembly 70 is in vertical alignment with a jar R which has been advanced by the infeed conveyor 12 into position on the turret 11. The caps C are carried in the pockets 63 of the transfer wheel 60 along a perforated bottom guideway forming plate 71 (FIGURE 3) which extends from the bottom guide plate 61 for the cap feed wheel 55 to the make up point A. The transfer wheel 60 carries the cap C beneath a top guide plate 72 which terminates at the make up point A. The pitch line 60' (FIGURE 3) of the transfer wheel 60 and the pitch line 70' of the spindle assemblies 70 on the capping head 13 pass through the make up point A where each successive cap C is picked up by a spindle assembly 70, so that the caps advance from the feed wheel 60 along a circular path with the head 13, the transfer of the caps from the wheel 60 occurring at the make up point A which is in a vertical plane passing through the vertical axes of the wheel 60 and the supporting shaft for the head 13.

Figure 7:
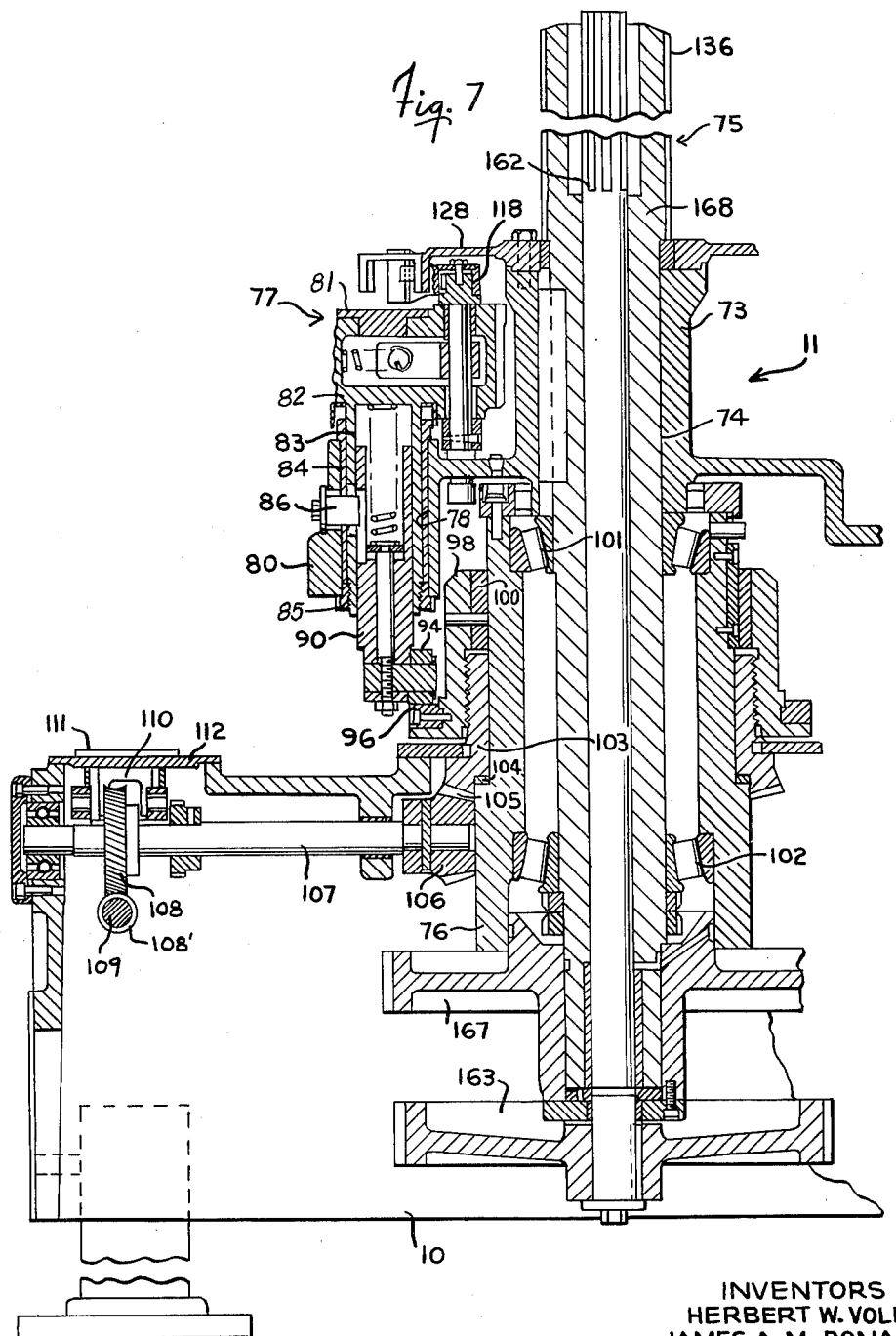
FIGURE 7 is a vertical section taken on the line 7—7 of FIGURE 4, to an enlarged scale, and with portions broken away or omitted.
Figure 8:
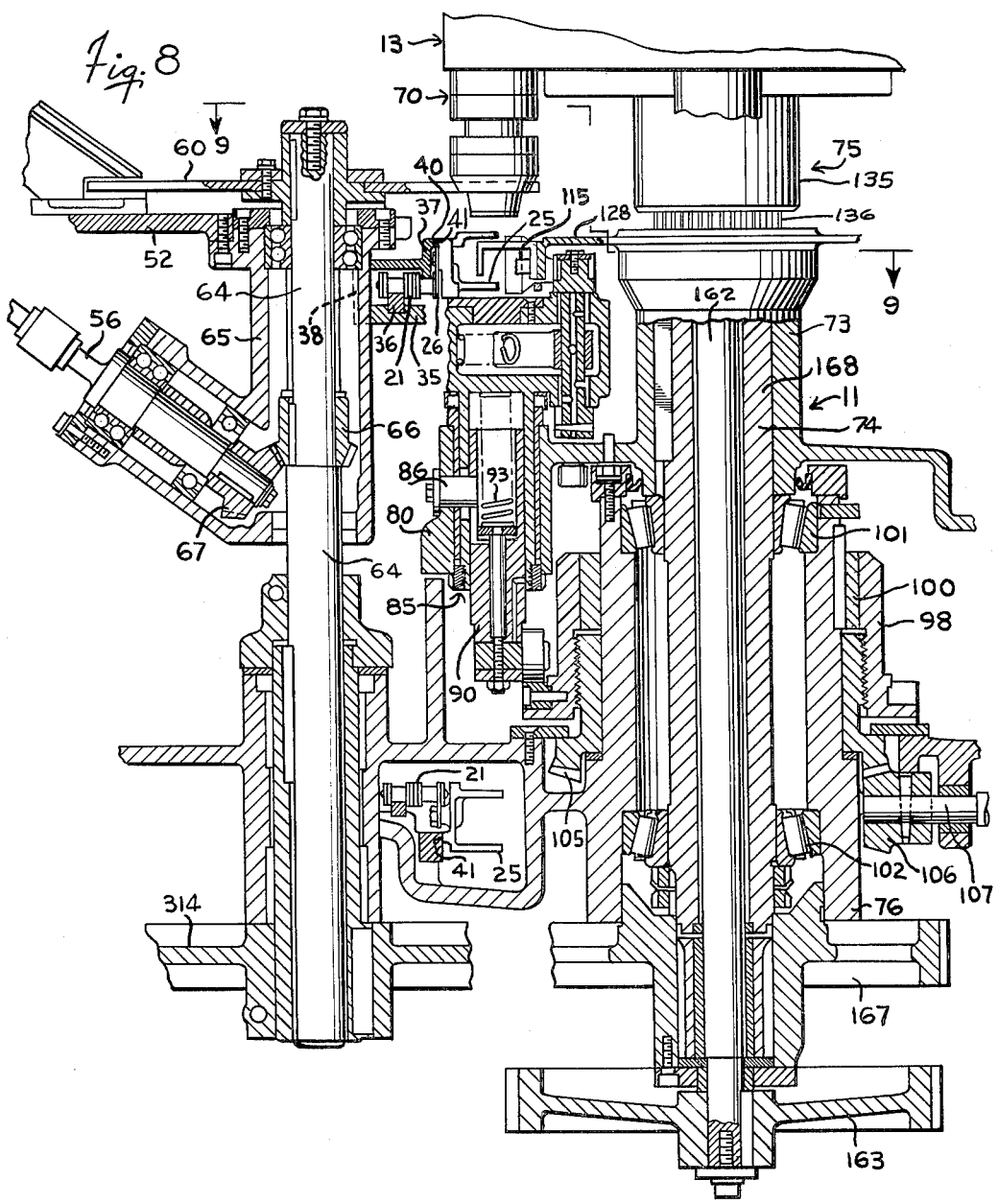
FIGURE 8 is a vertical section taken on the line 8—8 of FIGURE 4, to an enlarged scale, and with portions broken away or omitted.

The jar supporting and clamping turret 11 (FIGURES 7 to 11) comprises a casting 73 which is keyed to the lower section 74 of a main vertical drive shaft 75. The drive shaft section 74 is mounted for rotation in an upstanding hub forming portion 76 of the base 10. The casting 73 carries in horizontally disposed, peripherally spaced relation a plurality of jar supporting assemblies 77, each of which is mounted in a vertical bore 78 in a skirt forming portion 80 of the casting 73. Each of the assemblies 77 constitutes a work station having a jar supporting plate 81 on which the jar R is received and which is mounted on the top surface of a horizontally disposed cylindrical housing forming member 82 having a depending stem forming cylindrical housing member 83 which is locked in the bore 78 by means of an external bushing 84 and the lock nut 85 on the threaded lower end of the housing member 83. A radially extending key 86 having a flange on one end which is fastened to the casting 73 holds the member 83 against axial rotation in the sleeve 84. The flanged key 86 extends through a slot 87 in the side wall of the housing 83 and also into a vertical slot 88 in a vertically disposed pressure adjusting rod 90 which is slidable in the downwardly opening bore 91 in the housing member 83 and which has an upwardly opening pocket forming bore 92 in the upper end for accommodating a pressure spring 93 which is seated at one end in the upper end of the bore 91 and at the other end in the lower end of the bore 92. The pressure adjusting rod 90 carries at its lower end a cam roller 94 mounted on a transversely extending pin or shaft 95 which rides on the upper surface of a cam ring 96. The cam ring 96 is mounted on the bottom flange 97 of a supporting sleeve 98 which is pinned (FIGURES 7 and 8) to a bushing 100 on the upstanding hub formation 76 in which the lower shaft section 74 is mounted by means of vertically spaced bearings 101 and 102. The bushing 100 is keyed to the hub formation 76 so that it will slide thereon in an axial direction. Provision is made for adjusting the elevation of the sleeve 98 on the hub 76 so as to simultaneously adjust the pressure of the springs 93 in each of the assemblies 77 while the machine is operating. The supporting sleeve 98 for the cam ring 96 is connected in screw threaded relation to a sleeve 103 which is rotatably mounted on the hub 76 with its bottom end engaging a wear plate or ring member seated on a peripheral shoulder 104 on the hub 76 and having a toothed portion 105 which is engaged by a beveled pinion 106 (FIGURE 7) on the inner end of a horizontally extending adjusting shaft 107. The shaft 107 is journaled at one end in a depending bracket forming portion of the base 10 and at the other end in an outer wall of the base 10 and carries a worm gear 108 engaging with a worm 108' on a shaft 109 extending at right angles to the shaft 107. The shaft 109 is journaled at one end in a bracket forming member depending from the side wall of base 10 and at the other end in the outer wall of the base 10 with the outer end of shaft 109 being formed at 109' to accommodate a turning tool. An indicator mechanism 110 is associated with the shaft 107 to indicate the axial position of the shaft and thereby the spring pressure, with a window 111 in the top portion of the housing plate 112 through which the dial of the indicator 110 is visible. By rotating the shaft 109 manually with a suitable tool the shaft 107 rotates the adjusting sleeve 103 on the hub 76 to change the elevation of the cam carrying sleeve 98 so as to raise or lower the pressure adjusting rods 90 and vary the upward pressure exerted by the springs 93. The pressure adjusting rod 90 has an axial bore with a pin 113 mounted therein having a head forming plate 113' on which the lower end of the spring 93 is seated and a set screw 114 is provided to move the pin 113 and individually adjust the pressure exerted by the springs 93.

Figure 9:
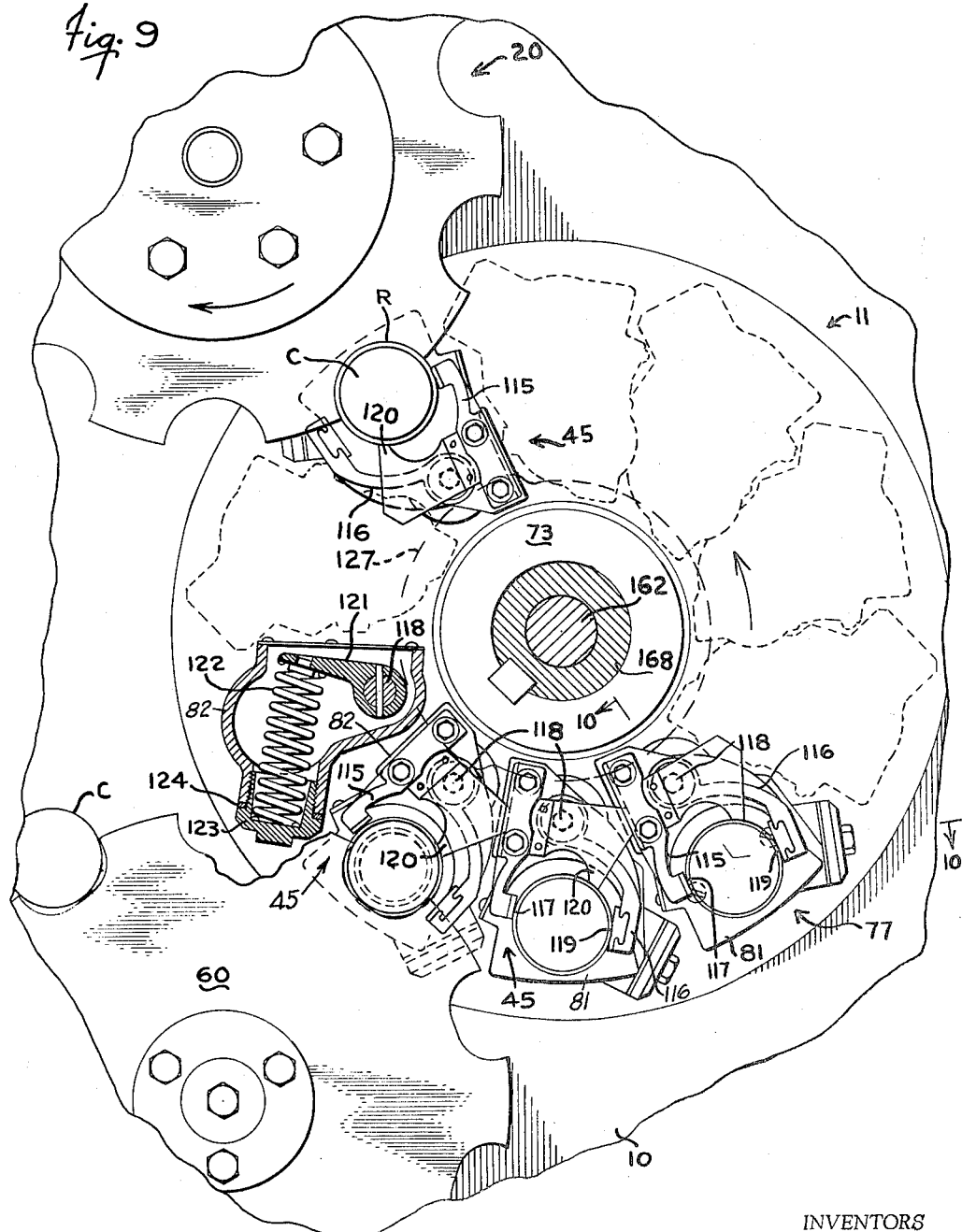
FIGURE 9 is a fragmentary section taken on the line 9—9 of FIGURE 8, to an enlarged scale, and with portions broken away or omitted.
Figure 10:
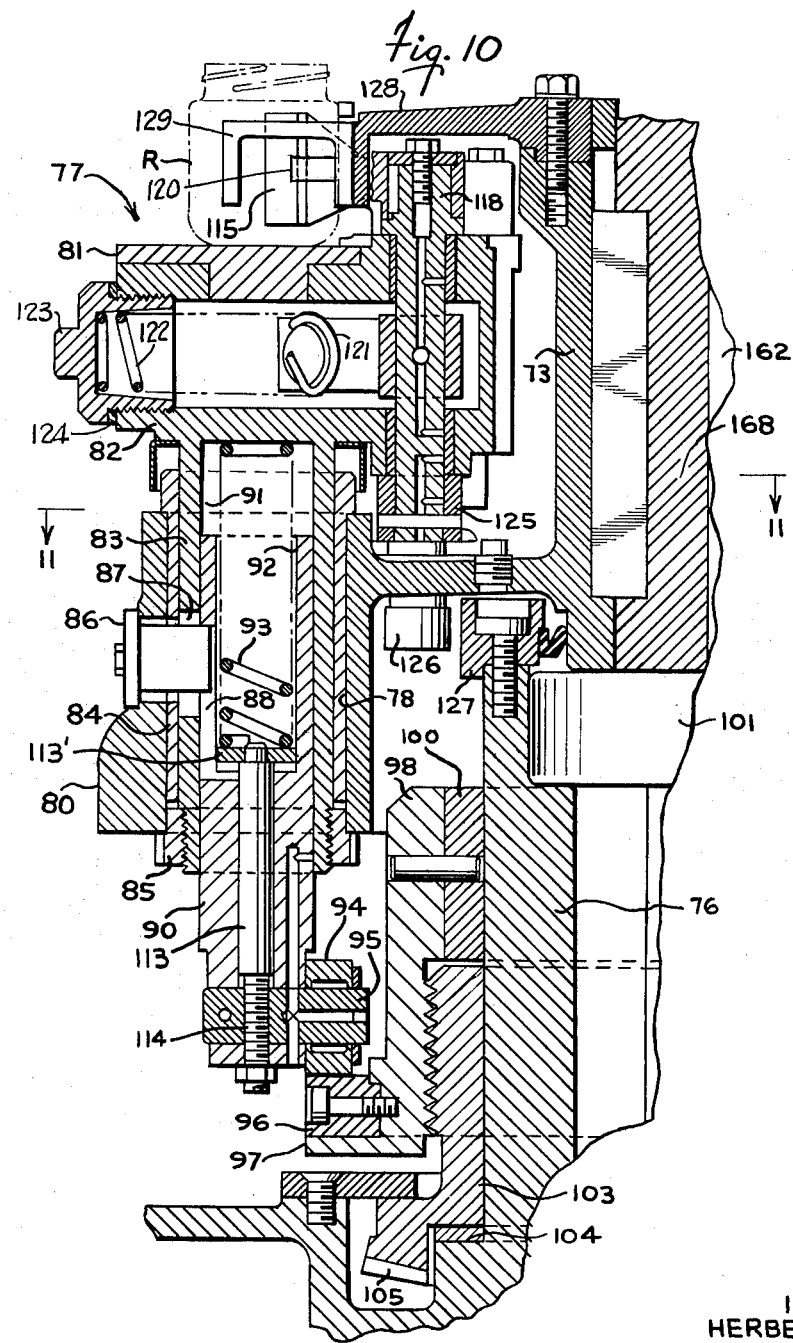
FIGURE 10 is a partial vertical section taken on the line 10—10 of FIGURE 9, to a still larger scale.
Figure 11:
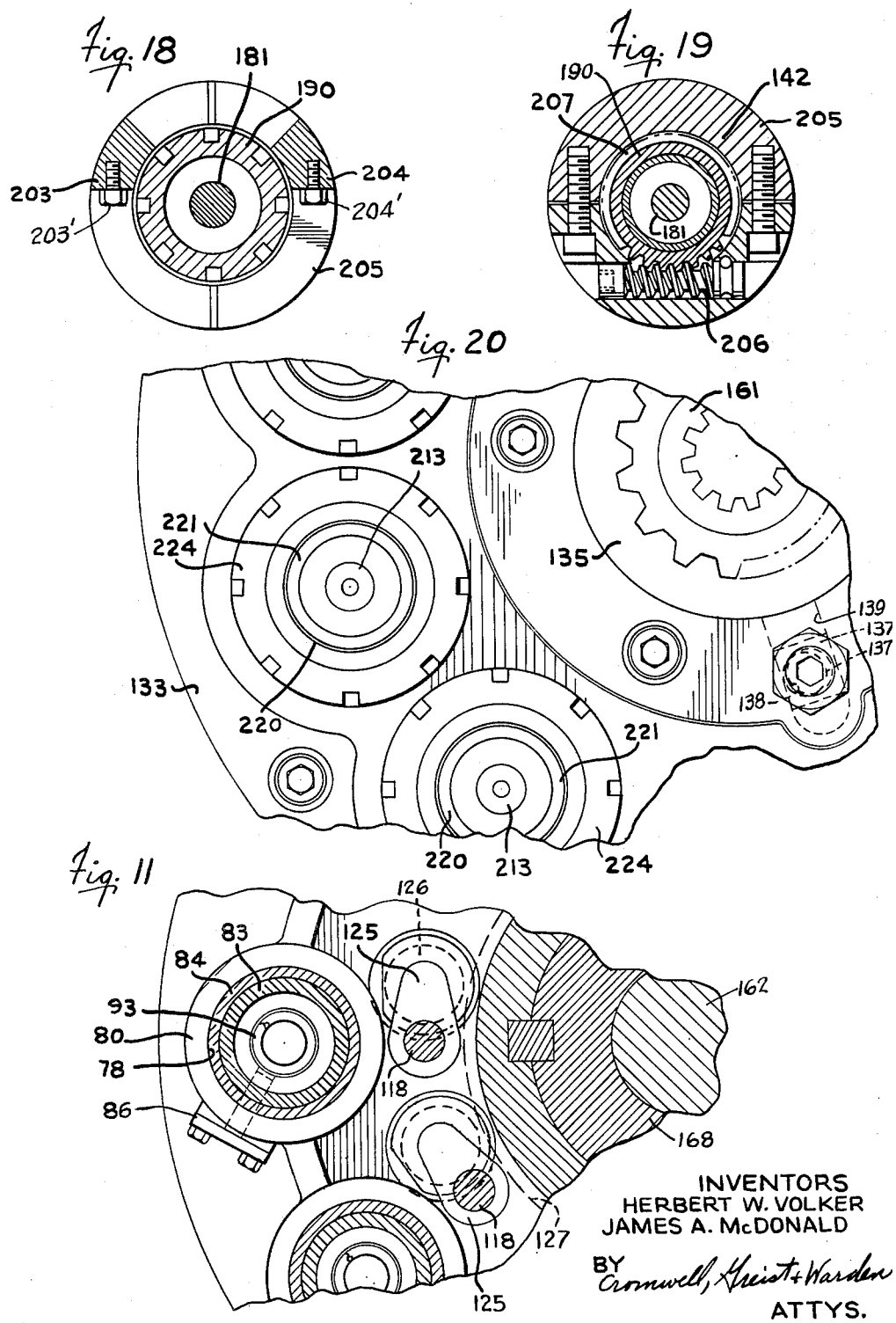
FIGURE 11 is a fragmentary horizontal section, taken on the line 11—11 of FIGURE 10.

As each jar R is moved onto a supporting plate or platen 81 of a jar supporting assembly 77 it is received between a pair of jar gripping arms or clamp members 115 and 116 (FIGURE 9). The one clamp arm 115 is bolted or otherwise secured in fixed relation on the inside top edge of the housing 82 and extends in a generally radial direction relative to the axis of the supporting shaft assembly 75 at the trailing side of the platen 81. A pad 117 on the free end of the arm 115 is formed of rubber or other suitable material for gripping the side wall of the jar R. The other clamp arm 116 is secured to the top end of a vertically disposed pivot shaft 118 which is mounted in suitable bearings in the vertically spaced walls of the housing forming member 82 in the top wall of which the platen 81 is mounted. The clamp arm 116 is curved in an outward direction and carries at its free end a jar gripping pad 119 preferably of rubber or rubber faced with fiberglass for engaging the side wall of the jar opposite the pad 117 on the arm 115. A jar engaging plate 120 of rubber or similar flexible material is mounted on the inner side of the arm 115 with its tip pushing the jar R into the center of the angle formed between the pad 117 on the one side and the pusher member 25 which is on the chain 21 and the jar guide rail 43 on the other side so as to accurately locate the jar R in proper position to receive a cap C which is entering over the jar at make up point B (FIGURE 33). The pivot shaft 118 extends through the interior recess in the housing member 82 and carries an arm 121 which engages at its free end with one end of a compression spring 122 disposed within the recess in the housing member 82 with its other end seated in a pocket on the inner face of a screw cap member 123 which closes an outer opening in the wall of the member 82 and which is provided with a replaceable or interchangeable spacer member 124 so that the cap may be adjusted to vary the pressure on the spring 122. The pivot shaft 118 carries on its lower end a cam arm 125 (FIGURES 10 and 11) with a cam roller 126 on the end thereof. A cam ring 127 is mounted on the top edge of the hub 76 and provided with a cam track for engaging the rollers 126 at the proper points to open the clamp arm 116 for release of the jar R at the discharge station and to hold the clamp arm 116 open until the infeed station is reached where a jar is moved onto the platen 81. A guard plate 128 (FIGURES 4 and 7) having peripherally spaced jar accommodating recesses 129 is secured on the top edge of the casting 73.

As a jar R moves onto a platen 81 on the jar supporting turret 11, a cap C is delivered by the transfer wheel 60 to the make up point where it is picked up by an oncoming spindle assembly 70 on the cap applying head 13 which is supported for rotation above the jar supporting turret 11 with each spindle assembly vertically aligned with a jar supporting assembly 77 so that a jar R, when properly positioned on a platen 81, is axially aligned with the axis of rotation of a spindle assembly 70 on the head 13.

The spindle assemblies 70 are mounted in peripherally spaced relation on a spindle supporting housing 130 (FIGURE 12) which is of generally cylindrical shape and which is suspended in rotatable relation from a top drive housing 14 (FIGURE 21). The spindle housing 130 is formed in three sections 131, 132 and 133 which are bolted together so as to operate as a unit. The uppermost housing section 131 is bolted to the flange of a supporting sleeve 134 which is rotatably mounted in the top drive housing 14 and constitutes part of the drive for the head 13. The lowermost housing section 133 is bolted to the flange of a connecting sleeve 135 which is aligned with the upper end 136 of the drive shaft assembly 75 in the turret structure 11. The sleeve 135 and the upper end 136 of the drive shaft assembly 75 have a sliding axial or splined connection so as to permit upward movement of the head 13 in adjusting the height of the head 13 relative to the turret 11. The three sections 131, 132 and 133 of the spindle housing 130 also function as a drive coupling between the main drive in the top housing 14 and the vertical shaft assembly 75 which drives the turret 11 and the associated mechanisms which are mounted on the base 10. The connection between the drive sleeve 135 and the lowermost section 133 of the housing 130 includes provision for a small amount of adjustment of the housing 130 about its vertical axis. An eccentric 137 (FIGURES 12 and 20) has its shank rotatably seated in a bore 138 in the flange of the sleeve 135 with a sliding plate 137' on the eccentric end which extends into a slot 139 in the lower face of the housing section 133 so that rotation in the bore 138 shifts the housing 130 about the vertical axis, the bolt holes for the connecting bolts between the housing section 133 and the sleeve 135 being larger in diameter than the bolts so as to permit shifting of the two members relative to each other by the eccentric 137.

Each of the spindle assemblies 70 is mounted for vertical movement in vertically aligned bores in the three sections 131, 132 and 133 of the housing 130. Each spindle assembly 70 comprises an upper subassembly 140 (FIGURE 13) and a lower subassembly 141 (FIGURE 14) the latter having its upper portion housed in the lower portion of the subassembly 140 with its lower end portion projecting below the same. The spindle subassembly 140 comprises an elongate housing 142 which has a dimension in the vertical direction somewhat greater than the corresponding dimension of the housing 130. The spindle housing 142 is supported in vertical sliding relation in the lower sleeve bearing 143 in the housing section 133, the intermediate sleeve bearing 144 in the intermediate housing section 132 and the top sleeve bearing 145 in the top housing section 131, the last mentioned sleeve 145 having a flange 145' which is bolted to the top rim of section 131 of the housing 130. The uppermost bearing sleeve 145 is provided with a key forming slide member 146 which engages with a flat surface 147 on the upper end of the spindle housing 142 to hold the housing against movement about its vertical axis while permitting vertical reciprocation thereof. The spindle housing 142 is divided into two parts or sections 148 and 150 which are connected for relative rotation about their vertical axis by a bearing forming coupling 151. The upper housing section 148 carries a bearing roller 152 on a cross pin 153 mounted in a bifurcated top forming and bearing portion of the housing section 148. A cam roller 154 is mounted on the inner end of the pin 153. The roller 152 engages with the downwardly facing cam track 155 while the cam roller 154 engages with an upwardly facing cam track 156 on a vertical movement controlling cam ring 157 mounted on the top housing 14. The cam ring 157 controls the vertical movement of the upper spindle housing 142 and thus the vertical movement of the entire spindle assembly 70. The lower section 150 of the spindle housing 142 which constitutes the upper or outermost portion of a slow speed cap turning or tightening spindle is provided immediately below the coupling 151 with a gear 158 for driving connection with the gear 160 which is keyed to a low speed vertical drive shaft member 161, the latter being journaled in the two lower sections 132 and 133 of the housing 130 and constituting the upper section of the main drive shaft assembly 75.

In the operative or working position of the head 13, the low speed spindle drive shaft member 161 is coupled to an inner drive shaft member 162 (FIGURES 7, 8, 24 and 25) in the lower drive shaft section 74. The drive shaft 162 carries on its lowermost end, within the base 10, a gear 163 which engages with an idler gear 164 (FIGURE 25) which is mounted on a vertically disposed idler shaft 165, the latter being supported in the base 10 in parallel relation with the shaft assembly 75. The idler shaft 165 carries an idler gear 166 which is driven by the gear 167 on the outer drive shaft 168 of the shaft section 74. The outer shaft 168 is coupled to the lower section 133 of the housing 130 through the coupling 135 and driven by rotation of the housing 130.

The upper section 148 of the spindle housing 142 has an inner, vertically disposed cap applying high speed spindle shaft 170 mounted therein which is supported at its upper end by the bearing coupling 171 mounted in a slide block 172 so as to move vertically with the slide block 172 in the upper end of the housing section 148. The upper housing section 148 has a vertical slot 173 and a pin 174 extends laterally through the slot 173 and carries a cam roller 175 which is positioned for engagement with the downwardly facing cam surface 176 on the outer flange of the cam ring 177 which controls the vertical movement of the slide block 172 and the shaft 170. The high speed spindle shaft 170 is supported at its lower end in a sleeve bearing 178 and is coupled at 180 (FIGURES 12 and 16) to the upper end of an inner high speed spindle shaft 181 mounted in the lower spindle subassembly 141 (FIGURE 14) and constituting an extension of the high speed spindle shaft 170. The high speed spindle shaft 170 in the upper section 148 of the housing 142 carries a gear 182 which is driven by the gear 183 mounted on the lower end of a high speed spindle drive shaft 184 in the uppermost section 131 of the housing 130.

The high speed spindle drive shaft 184 (FIGURES 12 and 21) is supported in upper and lower bearings 185 and 186 in the sleeve 134 which connects the housing section 131 with the top drive housing 14. The high speed spindle drive shaft 184 and the drive sleeve 134 for the head 13 are coupled in driven relation with the main motor drive shaft in the top drive housing 14 as will be hereinafter described.

Figure 12:
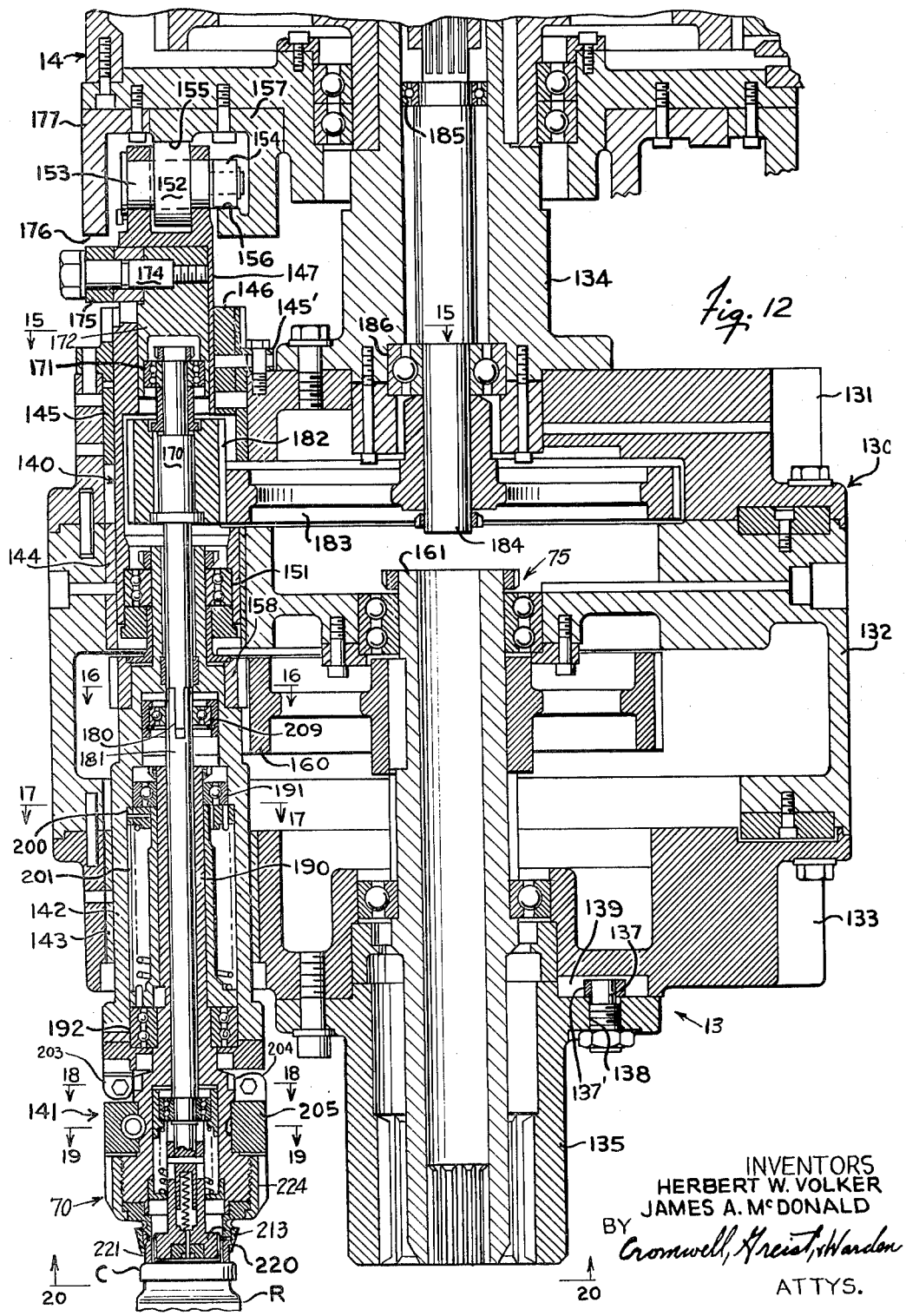
FIGURE 12 is a partial vertical section, on an enlarged scale, through the cap applying head, the section being taken on the same plane as FIGURE 8, and extending through one of the cap applying spindle assemblies.
Figure 13:
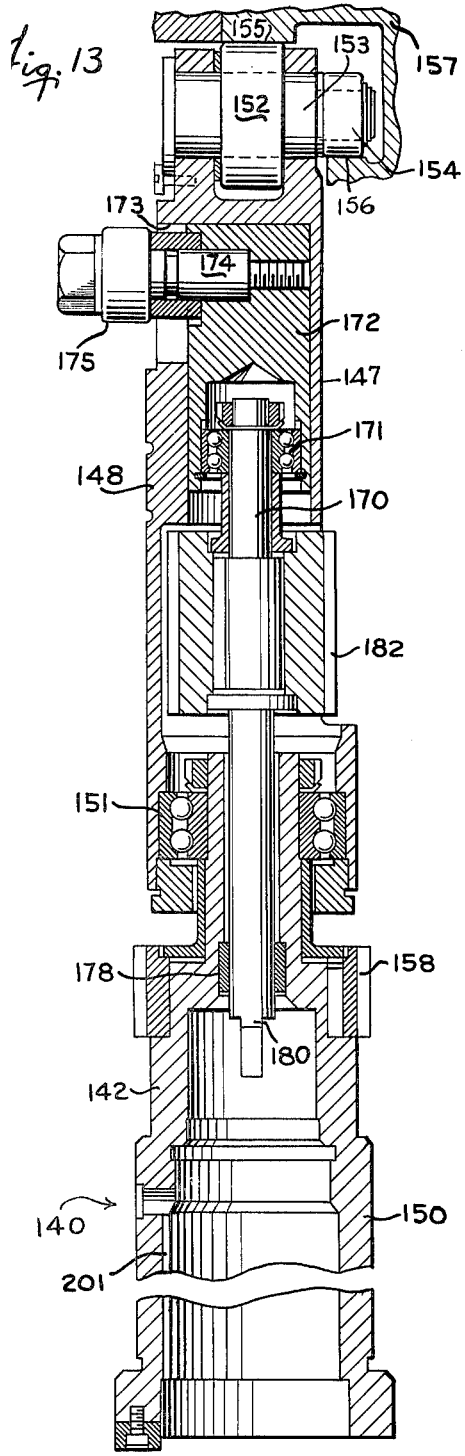
FIGURE 13 is a vertical section, on a still larger scale, showing the upper spindle subassembly, the view being taken on the same plane as FIGURE 12, and the lower spindle subassembly being removed.
Figure 14:
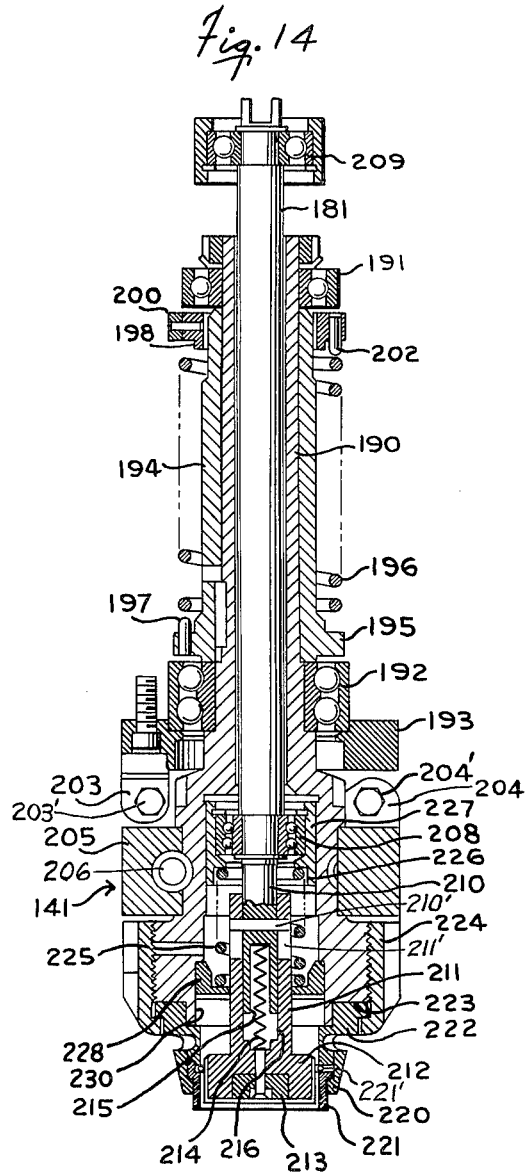
FIGURE 14 is an enlarged vertical section showing the lower spindle subassembly, the view being taken on the same plane as FIGURE 13.

The spindle subassembly 141 (FIGURES 12 and 14) has its uppermost portion housed in the lower section 150 of the spindle subassembly 140 (FIGURES 12 and 13). It comprises an inner sleeve member 190 which forms a housing for the high speed spindle shaft 181. The sleeve housing 190 is mounted within the housing section 150 of the spindle subassembly 140 by means of upper and lower bearing members 191 and 192 and is retained therein by the lower bearing clamp 193 which is secured to the lower end of the housing section 150. An outer sleeve 194 which extends between the bearings 191 and 192 is keyed to the inner sleeve 190 and has a peripheral flange 195 at the lower end forming a seat for a torque spring 196 which has one end 197 bent perpendicular to the coils and extended into a socket in the flange 195. The spring 196 extends to an upper retainer ring 198 which is anchored to the housing section 150 by a key 200 extending into a vertical internal slot 201 in the housing section 150. The upper end of the torsion spring 196 is anchored to the ring 198 by bending the end 202 perpendicular to the coils and seating it in a socket in the ring 198. Thus rotation of the sleeve 190 relative to the housing section 150 is resisted by the torque spring 196. Movement of the sleeve 190 about its axis relative to the housing section 150 is limited by engagement of a depending stop member 203 on the bearing clamping ring 193 and an upstanding stop member 204 adjacent the lower end of the sleeve 190. The stop members 203 and 204 are provided with screws 203' and 204' forming replaceable bumper members. The stop member 204 is a projecting portion of a clamp ring 205 (FIGURE 18) which is adjustable circumferentially on the sleeve 190 by means of a worm 206 and a toothed portion 207 (FIGURE 19) of sleeve 190 so as to adjust the amount of torque or resistance exerted by the torque spring 196.

The high speed spindle shaft 181 is supported at its lower end by the bearing 208 and at its upper end by the bearing 209. It has a lower end section 210 of reduced cross section which receives in sliding relation thereon the stem forming portion 211 of a cap pick up head 212, the latter having a bayonet slot 211' which hooks over a cross pin 210' on the shaft section 210. The cap pick up head 212 has a magnet 213 mounted in its lower face and is urged in a downward direction away from the end of the shaft 181 by a compression spring 214 seated at one end in a recess 215 in the end 210 of the shaft 181 and at its other end in a socket forming recess 216 in the head 212. The pick up head 212 is movable within a torque ring assembly 220 which carries a cap engaging pad 221 of ring-like form backed up by a spring washer 221' and surrounds the pick up head 212. The torque ring assembly 220 has a flange 222 which is seated in a peripheral recess 223 in the lower end of the sleeve 190 and held therein by the cap member 224 which is engaged in threaded relation on the end of the sleeve 190. A compression spring 225 is seated at one end in a recess 226 in the bearing housing 227 for the bearing 208 at the bottom end of the shaft 181 and has its other end seated in a retainer member 228 in an enlarged section 230 of the bore in the lower end of the sleeve 190 so as to urge the bearing housing 227 upwardly to hold the shaft 181 normally in the uppermost position.

The head 13 and the spindle assemblies are driven from the main motor 240 (FIGURE 2) which is mounted on a support bracket 241 attached to one corner of the top drive housing 14. The motor shaft 242 is connected by the pulley 243 and drive belt 244 with pulley 245 on a main drive shaft 246 (FIGURES 2 and 21). The main drive shaft 246 is journaled in one end of the housing 14 and carries at its inner end a bevel pinion 247 which is connected in driving relation with a cooperating bevel gear 248 on a vertically disposed drive shaft 250 which is supported in suitable bearings within the housing 14 and which carries on its inner end a drive pinion 251 connected in driving relation with gear 252 mounted on the upper end of the drive sleeve 134 for the housing 130. The bevel gear 248 carries a gear 253 on its upper extending hub portion which engages with a gear 254 mounted on the upper hub portion of gear 256. Gear 256 is carried by vertically disposed drive shaft 255 also mounted in bearings within the housing 14. The drive shaft 255 has its lower or inner end coupled with the high speed drive shaft 184 which is housed within the drive sleeve 134. The bevel gear 256 engages with a pinion 257 on a horizontally disposed slidable hand shaft 258 having on its outer end a hand wheel 259 to permit manual turning of the drive mechanism for adjustment and like purposes.

The top drive housing 14 and associated mechanism is supported on the vertical post assemblies 15, 16 and 17 which are identical in construction. Each of the support posts, as shown with respect to post assembly 15, comprises a hollow inner post member 260 which is secured in fixed relation at its bottom end to the base 10 and a telescoping cylindrical sleeve or housing member 261 which has a flange 262 at its upper end, which flange 262 is bolted to the housing 14. A screw 263 is mounted in screw threaded relation in a block 264 at the top of the post member 260 and is journaled at 265 in the top end of the post sleeve member 261. The screw 263 is provided at its upper end with a bevel gear 266 extending within the housing 14 and engaging with a bevel pinion 267 on a horizontally disposed shaft 268 (FIGURE 2) which is supported in suitable bearings in the housing 14 and extends to the post 16 where it is connected by a bevel pinion 270 with a bevel gear 271 on the top of the post assembly 16. The shaft 268 has its end adjacent the post assembly 16 extending through the wall of the housing 14 and shaped at 272 to receive a tool for turning the same manually. The shaft 268 carries a bevel pinion 273 which engages with a bevel pinion 274 on the end of a second horizontally disposed shaft 275 which is journaled in the housing 14 and which extends to the post assembly 17 where it carries a bevel pinion 276 which engages with a cooperating bevel gear 277 on the top of the post assembly 17. The shaft 275 is also extended at its end through the wall of the housing 14 and provided with a suitable formation 278 for receiving a turning tool so that the housing 14, the cap feeding and transfer apparatus 18 and the head 13 carried thereby may be raised and lowered on the supporting posts 15, 16 and 17 by applying a turning tool at 272 or 278.

The head 13 is adjusted vertically to position the bottom end of each spindle assembly 70 at the proper elevation so as to place the cap C some degrees after the cap had been picked up by the cap pick-up head 212 on the jar R which had been moved into position on the platen 81 beneath the lower end of the spindle assembly 70 to receive the cap. The cap C is placed on the jar mouth initially by engagement of the cam roller 152 with the cam surface 155 causing a downward movement of the entire spindle assembly and the engagement of the cam roller 175 with the cam surface 176 which lowers the pick-up head 212 below the cap engaging pad 221 prior to the cap pick up. The high speed spindle shaft 170 with the pick-up head 212 at its lower end is spun sufficiently to seat cap C snugly on the jar R as the entire spindle assembly 70 continues its downward movement sustaining the relative location between the pick-up head and the cap engaging pad. These operations occur as the jar R is being advanced by the infeed conveyor 12 and picked up by the gripping arm member 115 on the rotating turret 11 where the jar is located by the jar engaging plate 120 against the arm 115 on one side and the pusher member 25 on the other side moving the jar in a straight line while the cap is being applied. As the turret 11 and head 13 continue to rotate in the same direction, the jar R is clamped between the clamping arms 115, 116 leaving its straight line path and the cap engaging pad 221 is seated on the cap C forcing the cap and jar on the platen 81 to deflect downwardly against the spring 93. At this time the cam roller 175 is moving upward on the cam surface 176 and leaving the cam surface places the slide block 172 against the adjacent surface of the upper housing section 148 within the upper spindle assembly 140 which locates the pick-up head 212 somewhat above the engaging pad 221. The cap C is then rotated at slow speed, by rotation of the lowermost spindle housing section, to tighten the cap on the jar mouth. The torque applied in turning the cap tight is determined by the torque spring 196 which is connected between the housing 150 and housing 190. The driving torque is preset with the stop member 204 touching the stop member 203 by turning the worm 206 which engages with the toothed portion of the inner sleeve 190, causing the outer sleeve 194 which is keyed to sleeve 199 to wind up the torque spring to a predetermined rotational load. After the cap has been sufficiently tightened and the preset driving torque has been reached, the lowermost spindle will stop turning, being held by frictional force between the cap C and the cap engaging pad 221 while the spindle housing 150 continues to turn causing the stop members 203 and 204 to separate. As the cap applying spindle 70 is raised, the torque spring causes the lower spindle to unwind to the point where stop member 204 is hitting stop member 203, returning the lower spindle to its original preset driving torque. The cap applying spindle assembly 70 is raised, when the capped jar reaches the discharge mechanism 20, to release the capped jar for discharge from the turret 11.

Discharge of the capped jars from the jar supporting turret 11 follows the tightening of the cap and is accomplished through discharge mechanism 20 which comprises a rotatable discharge wheel or turret 280 (FIGURES 3, 4, 22 and 23) and an associated discharge conveyor 281. The discharge turret 280 which removes the capped jars from the supporting turret 11 comprises upper and lower vertically spaced plate-like wheel members 282 having semi-circular pocket formations 283 spaced about the periphery thereof, which plate-like members 282 are arranged on the top end of a vertically disposed drive shaft 284 so that the pitch line 280' (FIGURE 3) of the pockets 283 is tangent to the pitch line 70' of the spindle assemblies 70 and jars R on the jar supporting turret 11 at a point approximately 245° around the turret from the make up point B (FIGURES 3 and 33) where the cap is assembled with the jar. The vertical drive shaft 284 is mounted in a housing 285 set in an aperture in the base 10. A gear 286 is mounted on the lower end of the shaft 284 and engages in driven relation with the gear 167 on the main drive shaft member 168 so that the turret 280 is operated in timed relation with the rotation of the turret 11 which is connected to the drive shaft 168. A guide rail assembly 287 extends partially about the turret 280 and cooperates with the pockets 283 and bottom jar supporting plates 288 in moving the jars in a circular path to a discharge point. The bottom jar supporting plates 288 and the side guard members or jar guide assembly 287 are arranged so as to cooperate with the turret plates 282 in providing a curved pathway for transfer of the capped jars from the turret 11 to the discharge conveyor 281. The jar supporting and guiding members are connected to the infeed conveyor guiding and supporting assembly 30 and are supported at one side on the top of the plate portion 33 of vertical column or post 34 while at the other side they are supported on a bracket 290 (FIGURES 6 and 23) which is secured to the outside face of the upstanding shaft housing 285 and which also supports the one end of the discharge conveyor 281. The bottom plates 288 extend between the top bracket member 33 on the post 34 and the bracket 290 being connected to the plate 35 at one end and to the bracket 290 at the other end. The side guide assembly 287 is in three segments or sections 292, 293 and 294 which are bolted to each other and which have aligned vertical walls forming a continuous circular path of the jars. The innermost guide section 292 is mounted on the base plate 35 of infeed guide assembly 30 and provides the guide surface 295 and also guide surface 42. The guide surface 295 of the innermost guide section 292 guides the jars R into the pockets 283 of the discharge turret 280. The outermost guide section 294 is supported on the bracket 290 at 296 and 297.

The discharge conveyor 281 (FIGURES 4, 6 and 23) comprises an endless chain 298 carrying jar supporting plates 300 which is supported at the end adjacent the discharge turret 280 on an idler sprocket 301 carried on a shaft 302 journaled in the support bracket 290. The chain 298 is supported at the other end on a stand supported drive sprocket (not shown) which is driven through shaft and gear connections which are coupled by a driven shaft extension with a right angled gear drive which, mounted on a suitable bracket on the base 10, is driven by a connecting drive shaft 303. The drive shaft 303 extends from the housing 285 and has a bevel gear 304 on its inner end engaging with a bevel gear 305 on the vertical drive shaft 284 for the discharge turret 280. The sprocket 301 is positioned so that the upper run of the conveyor passes beneath the pockets 283 of the turret plates 282 and receives the jars as they are advanced over the outermost bottom support plate 288.

The drive mechanism for the machine includes a drive connection for the jar filling machine with which the capping machine is adapted to be used. The filling machine is connected through a gear type, in motion timing device by horizontal shaft 306 (FIGURES 24 and 26) which is journaled in the base 10 with a bevel gear 307 engaging with a bevel gear 308 on a small vertical idler shaft 309. The shaft 309 has a pinion 310 which engages with a gear 311 (FIGURES 8, 24, 26 and 31) on the bottom end of the vertical shaft 312 which has a bevel gear connection 313 with the drive shaft 23 for the infeed conveyor 12. The pinion 310 engages with a gear 314 on the bottom end of the shaft 64 for the cap transfer wheel 60. Driving the filling machine in this manner, of course, permits the operation of the two machines to be readily synchronized.

Preferably, the machine incorporates apparatus for vapor-vacuum or inert gas sealing or a mixture thereof. A steam chamber assembly 315 (FIGURES 3, 5, 27, 28 and 29) is mounted above the infeed conveyor 12 in the area approaching the cap and jar assembly or make up point. The steam chamber assembly 315 provides a downwardly opening passageway 316 (FIGURES 3 and 27) for the tops of the jars on the infeed conveyor 12 which extends from the edge of the machine to the make up point, indicated at B, in FIGURES 3 and 27. The passageway 316 is formed by laterally spaced side sections 318 and 319 of the assembly 315 which are connected at the outer end by a top cover forming steam box 320 and at the inner end by the plate 321, the latter having a portion 71 serving also as a support plate for the caps C as they are moved by the transfer wheel 60 to the make up point A for pick up by a spindle assembly 70 on the cap applying head 13. The plate 321 is cut away at 322 to allow the caps to be moved down onto the jar tops. The plate 321 has slots 324 providing passageways for steam to reach the bottom of the caps. The steam chamber section 318 has a branch 325 extending beneath the cap transfer wheel 60. The oppositely facing walls of the chamber sections 318 and 319 are slotted at 326 and 327 (FIGURES 28 and 29) to allow for passage of the steam into the passageway 316 above the jar tops. Steam is supplied to the various portions of the steam chambers by suitable tubing connected with a low pressure steam supply system (not shown). At the inner end of the steam chamber section 318 a plurality of upwardly and inwardly slanted bores forming passageways 328 (FIGURE 5) are provided so as to direct jets of steam, gas or a mixture of both into the cap as it is lowered by the spindle assembly 70 onto the mouth of the jar. A plurality of slots 329 are also provided in the section 318 below the bores 328 which direct vapor, gas or a mixture thereof into the area below the cap. The opposite wall of section 319 is slotted at 330.

The machine will be provided with suitable safety arrangements including an apparatus (not shown) for interrupting the feed of the caps in the event there is an interruption or stoppage of the feed of the jars. In addition, if there is failure of the jar feed and a cap is fed when there is no jar to receive it, provision is made for removing the unused cap C when it reaches the discharge turret 280. A cap discharge chute 335 (FIGURE 3) is mounted, with the inner end thereof adjacent the head 13, by means of a pair of angle brackets 336 extending from the steam chamber assembly 315. The chute 335 is formed by a top plate 337 and laterally spaced depending side guide bars 338 and 339. A series of magnet bars 340 are set in slots in the top plate 337 to hold the caps in the chute. The curved inner end 341 of the one side guide bar 338 is positioned relative to the path of travel of the spindle assemblies 70 so that a cap retained on a cap pick up head 212 by the magnet 213 will be wiped off by the end 341 of the bar member and advanced into the cap discharge chute 335 by an upstanding leg of one of a plurality of circumferentially spaced arm forming angle members 342 (FIGURE 3) on the turret 280. The unused caps are moved beneath the magnets 340 by the arms 342 which pass out of the chute 335 through a slot 343 in the side wall 339. They are moved, by engagement with each other, to the end of the chute 335 where they drop into a receptacle or are otherwise disposed of.

Provision is made for adjusting the machine so as to apply the cap to the jar at the proper time, by setting of the head 13 so that each of the spindle assemblies 70 is at the correct height. A gauge device 345 (FIGURES 1 and 30) is mounted on the vertical post 16 by means of a pair of vertically spaced brackets 346 and 347 which are attached to the movable upper sleeve and the lower fixed post members, respectively, so that the uppermost bracket 346 moves vertically when the height of the spindle head 13 is adjusted while the lowermost bracket 347 remains in a fixed position. The lowermost bracket 347 supports a cup-shaped spring housing 348 which opens upwardly and receives therein compression spring 350 and retainer cap 351, the latter comprising a hollow stem portion 352 and a top plate 353, with a gauge ring 354 seated on the stem portion 352 adjacent the top plate 353 and the upper end of the spring 350 seated in the stem portion 352. A screw 356 is threaded into the bracket 347 securing the gauge housing by threading the upper portion of the screw thread into the retainer cap 351 which makes the housing readily removable. The platform or platen forming top plate 353 of the retainer cap 351 is of greater diameter than the outside diameter of the housing 348 so that a peripheral margin overlies the top edge of the housing. The uppermost mounting bracket 346 carries a plate 357 on the end of a vertically disposed stem 358 which is received in sliding relation in a vertical bore 360 in the uppermost mounting bracket 346. The stem 358 carries a light compression spring 361 seated in an enlarged lower end portion of the bore 360 so as to normally hold the plate 357 in an extended position. The stem 358 is slotted at 363 and a locking screw 364 has its inner end extending into the slot 363 to limit the movement of the plate 357.

In using the gauge device 345 for adjusting the machine, an uncapped jar R of the height to be run through the machine is placed on the plate 353 and the capping head 13 is lowered by operating the height adjusting mechanism shown in FIGURES 2 and 21 to bring the plate 357 down onto the top of the jar, compressing the spring 361 until the upper end of the stem 358 is flush with the upwardly facing edge 362 of the bracket 346. The lowermost bracket 347 is mounted to the lower post member 16 in a predetermined relation to the spindle assemblies 70 so as to position the cap pick-up head 212 at the correct height above the jar R on the turret 11 when the upper end of the stem 358 is flush with the edge 362.

Provision is also made to gauge the spring 93 for uniform pressure in each of the jar supporting platen assemblies 80 on the jar turret 11. The retainer cap 351 is unscrewed to release the housing 348, the housing 348 is removed from the bracket 347 and the gauge ring 354 of predetermined thickness is removed from the stem 352. The cap 351 is replaced without the gauge ring. Spring 350 is selected and arranged so that when a vertical or downward force of a predetermined amount, for example, 100 lbs. is applied to the top surface of the plate 353 the ring 354 will fill the space between the plate 353 and the top edge of the housing 348. Adjusting shims 355 may be used to compensate for inaccuracies in the spring design. The housing 348 is placed on each platen assembly 80 with the sleeve 98 (FIGURE 7) adjusted to a predetermined height by means of the drive shaft 109 and the head 13 at a height predetermined so as to assure a ⅛″ deflection of the platen assembly 80 at the lowermost point of the spindle assembly 70, after the spring 93 has been adjusted by means of the set screw 114 to a pressure that will close the gap between the top edge of the housing 348 and the cap plate 353 to the dimension of the gauge ring 354.

Power is supplied for operating the machine as illustrated diagrammatically in FIGURE 31. The horizontally disposed motor driven power shaft 246 is connected by gearing in the top housing 14 (FIGURE 21) to the driving sleeve 134 for the turret housing 130 forming the capping head 13 and also forming a connection with the hollow outer shaft 168 of the main vertical drive shaft assembly 75. The power drive shaft 246 is also connected through gearing in the top housing 14 to the high speed vertical drive shaft 184 for the spindle assemblies 70. The shaft 184 is connected through gearing in the housing 130 with the high speed cap applying spindle shafts 181. The drive connection for the low speed spindle housing 142 is through the hollow vertical shaft 161 coupled to the inner vertical drive shaft member 162 which is driven by the hollow outer shaft 168 through a train of gears 163, 164, 166 and 167 at the bottom of these shafts. The jar supporting turret 11 is connected to the shaft 168 for rotation therewith. The vertical shafts 64 and 284 for the cap feed 18 and the capped jar discharge mechanism 20 are driven by gear connections 167, 314 and 167, 286 at the bottom of the hollow shaft 168. The jar infeed conveyor 12 is driven through the sprockets 22 and gear driven shafts 23 and 312, the latter being connected by gears 310 and 311 with the driven gear 314 on the shaft 64.

In operating the capping machine (FIGURES 3, 32 and 33) the jar infeed conveyor 12 delivers successive filled jars R to the machine on a straight line path which extends through the vapor-vacuum mechanism 315 positioned below the cap feeding and transfer mechanism 18. The jars are advanced on a straight line path to the make up point B (FIGURES 3 and 33) where the caps C are applied to the jars. The straight line path of the jars intersects at B and B' (FIGURE 3) the pitch line or center line path 70' of the cap applying spindle assemblies 70 on the head 13. The caps C are delivered from the supply magazine or chute 50 by feed wheel 55 to the transfer wheel 60 and transferred to the spindle assemblies 70 at the point A (FIGURE 33) where the pitch line 60' of the transfer wheel 60 is tangent to the pitch line 70' of the spindle assemblies. The caps are picked up and held on the spindles by the magnets 213 in the ends (FIGURES 12 and 14) of the high speed inner spindle assemblies. The caps C are carried on a circular path by the spindle assemblies 70 to the make up point B while each successive spindle assembly is lowered to spin the cap onto the top of the jar R which has been aligned vertically with the spindle assembly at this point by advancing movement of the conveyor 12, the center line path of the jars on the conveyor intersecting at this point the pitch line 70'. Prior to arrival at the make up point B the top of the jar and the open bottom face of the cap C are subjected to steaming operations in the passageway 316 of the vapor-vacuum mechanism 315. Prior to and while the cap C is spun onto the top of the jar R, the jar is traveling in a straight line path under the control of conveyor 12 so that there is no tendency for the contents to be thrown out of the top of the jar. The cap which is carried in a circular path by the spindle accommodates itself to the movement of the jar by reason of its attachment to the spindle assembly by magnetic attraction only. As the jar R with the cap spun on the same reaches the point B' where the straight line path of the conveyor 12 crosses the pitch line 70' of the spindle assemblies, that is, at the end of its chordal path between B and B', the jar R is gripped by the gripper mechanism 45 (FIGURE 9) and carried in a circular path about the turret 11 with the center line of the path of travel of the jar and cap assembly coinciding with the pitch line 70' of the spindle assembly 70 on the cap applying head 13. The slow speed outer spindle assembly is lowered to frictionally engage the ring 221 with the top of the cap and slow speed rotation of the housing 142, which carries the friction ring 221, turns the cap tight while the cap and jar assembly are advancing around the turret 11 to the discharge mechanism 20, the housing 141 making a partial rotation during the tightening of the cap. Sufficient pressure is applied to the jar R by the pressure spring 93 (FIGURE 10) to insure a tight grip on the cap by the friction ring 221 and to get the desired seal of the jar. The operation of the torque spring 196 in each spindle assembly insures that each cap is turned tight with the same amount of torque. When the capped jars reach the discharge mechanism (FIGURES 3 and 4) they are released by the gripper mechanism 45 and move into the pockets 283 of the discharge turret 280 which carries them to the discharge conveyor 281. If there is a failure of the feed of the filled jars and a cap is fed for pick up by the head 212 without a jar being supplied to the cap, the cap discharge device 335 removes the cap from the end of the spindle assembly 70 and the cap is carried out of the machine.

The machine may be readily employed for capping operations with press-on caps by removing the gear 163 (FIGURE 31) and gear 183 (FIGURES 12 and 21) eliminating the rotation of the spindle drives.

While particular materials and specific details of construction have been referred to in describing the illustrated form of the machine, it will be understood that other materials and equivalent details of construction may be resorted to within the spirit of the invention.

We claim:

1. A machine for applying caps to jar-like containers comprising straight line conveyor means for advancing successive containers to be capped to a container and cap assembly station, cap feeding and transfer means for advancing successive caps to said assembly station, a turret conveyor disposed at one side of said straight line conveyor and carrying a plurality of container supporting members in a circular path which intersects the path of the straight line conveyor at two spaced points so that containers are delivered to the supporting members and then advanced a predetermined distance by the straight line conveyor along a chordal path relative to the path of the supporting members, means adjacent each container supporting member for gripping and holding a container thereon as it reaches the end of said chordal path, a capping head mounted for rotation above said turret and on an axis coinciding with the axis of rotation of said turret, said head having a plurality of spindle assemblies spaced around the periphery thereof which are operative to place a cap on each successive container, each said spindle assembly having axially aligned inner and outer spindles which are mounted for movement in a vertical direction relative to each other, the inner spindle having a releasable cap gripping member on the lower end adapted to engage a cap delivered to said assembly station and advance the cap above a container as it moves onto the turret, cam means for raising and lowering the spindle assembly, cam means for raising and lowering the inner spindles in timed relation to the movement of the turret, and drive means for rotating the inner and outer spindles in timed relation to the movement of the turret so as to position a cap on a container and turn it down while the container moves along said chordal path and thereafter turn said cap tight on the top of said container.

2. A machine for applying caps to jar-like containers, comprising straight line conveyor means for advancing successive containers to be capped to a container and cap assembly station, cap feeding and transfer means for advancing successive caps to said assembly station, a turret conveyor disposed at one side of said straight line conveyor and carrying a plurality of container supporting platforms in a circular path which intersects the path of the straight line conveyor at two spaced points so that containers are delivered to the supporting platforms and advanced by the straight line conveyor along a chordal path relative to the path of the supporting platforms, means for gripping and holding the containers on the platforms as they advance beyond the end of the chordal path, a capping head mounted for rotation above said turret and on an axis coinciding with the axis of rotation of said turret, said capping head having a plurality of spindle assemblies spaced around the periphery thereof in vertical alignment with the container supporting platforms for placing a cap on each successive container, each said spindle assembly having axially aligned inner and outer spindles which are mounted for movement in a vertical direction relative to each other, the inner spindle having a member on the lower end positioned to engage a cap delivered to said assembly station and to releasably hold the cap above a container, cam means for raising and lowering the spindle assembly, cam means for raising and lowering the inner spindles in timed relation to the movement of the turret and independent drive means for imparting high speed rotation to the inner spindles and slow speed rotation to the outer spindles in timed relation to the movement of the turret so as to position a cap on a container and rapidly turn it down while the container moves in a straight line along said chordal path and thereafter turn said cap tight on the top of said container while the container is carried in a circular path on said turret.

3. A machine for applying caps to jar-like containers, comprising means for advancing successive containers to be capped to a container and cap assembly station in a straight line, cap feeding and transfer means for advancing successive caps to said assembly station, a rotating turret conveyor disposed at one side of said straight line conveyor and having container supporting means moving in a circular path which intersects the path of the straight line conveyor at two spaced points so that containers are delivered to the supporting means while they are advancing in a straight line along a chordal path relative to the path of the container supporting means, means for gripping and holding a jar on the turret when it reaches the end of said chordal path, a capping head mounted for rotation above said turret on an axis coinciding with the axis of rotation of said turret, said capping head having a plurality of spindle assemblies spaced around the periphery which are aligned vertically with the container supporting means for placing a cap on each successive container, each said spindle assembly having axially aligned spindles which are movable vertically relative to each other, a gripping member on the lower end of one spindle adapted to engage a cap delivered to said assembly station and to advance the cap while turning it on a container, a gripping member on the other spindle for tightening the cap when it is seated on the container, cam means for raising and lowering the spindle assembly and the respective spindles in timed relation to the movement of the turret and means for rotating the spindles in timed relation to the movement of the turret so that said one spindle positions a cap on a container, rapidly turns it down and releases the cap while the container is advanced along said chordal path and thereafter the other spindle grips the cap and slowly turns the cap tight on the top of said container while it is advanced along a circular path by the turret.

4. A machine as recited in claim 3, and means for adjusting the pressure applied to the cap by the spindle.

5. In a machine for applying caps to jar-like containers, straight line conveyor means for advancing successive containers to be capped to a container and cap assembly station, cap feeding and transfer means for advancing successive caps to said assembly station, a turret conveyor disposed at one side of said straight line conveyor and carrying a plurality of container supporting platens in a circular path which intersects the path of the straight line conveyor at two spaced points so that containers are moved onto the supporting platens while they are advanced by the straight line conveyor along a chordal path relative to the circular path of the supporting platens, means on the turret conveyor at each platen for gripping and holding a jar thereon as it reaches the end of said chordal path, a capping head mounted for rotation above said turret conveyor on an axis coinciding with the axis of rotation of said turret conveyor, said capping head having a plurality of spindle assemblies spaced around the periphery thereof with their axes disposed to travel in a path aligned above the path of travel of the axes of containers on the platens, each said spindle assembly having axially aligned inner and outer spindles which are mounted for movement in a vertical direction relative to each other, the inner spindle having a cap receiving member on the lower end adapted to engage a cap delivered to said assembly station so as to advance the cap above a container on the platen beneath said spindle assembly and the outer spindle having a friction member on the lower end for engaging a cap after it is positioned on a container, means for raising and lowering the spindle assemblies and for moving the inner and outer spindles vertically relative to each other in timed relation to the movement of the turret conveyor and means for rotating the inner and outer spindles in timed relation to the movement of the turret conveyor so as to position a cap on a container and turn it down while the container is advanced along said chordal path and thereafter turn said cap tight on the top of said container while it is held on its supporting platen and advanced around a portion of the circular path of said turret conveyor.

6. A capping machine for applying caps to the threaded mouths of jar-like containers, comprising a turret supported on an upright frame for rotation about a vertical axis, said turret having a plurality of container supporting assemblies mounted about the periphery thereof, a cap applying head supported above said turret for rotation on a vertical axis aligned with the vertical axis of the turret, said cap applying head having spindle assemblies spaced about the periphery thereof which are in vertical alignment with said container supporting assemblies, means for feeding containers onto the container supporting assemblies, means for feeding caps to the spindle assemblies, said spindle assemblies each having inner and outer spindles with means for releasably gripping a cap, means for reciprocating the spindle assemblies vertically so as to lower the caps onto the containers, means for rotating the inner and outer spindles to turn the caps onto the containers and to tighten the caps, and means associated with the outer spindle for limiting the turning force thereof so that the caps are seated onto the containers with a predetermined torque.

7. A capping machine for applying caps to the mouths of jar-like containers, a turret supported on an upright frame for rotation about a vertical axis, said turret having a plurality of container supports mounted in spaced relation about the periphery thereof, a cap applying head supported above said turret for rotation on a vertical axis aligned with the vertical axis of the turret, said cap applying head having spindle assemblies mounted in spaced relation about the periphery thereof which are vertically reciprocable and in vertical alignment with said container supports, means for feeding containers in a straight line onto the container supports, means for feeding caps to the spindle assemblies, said spindle assemblies each having two relatively rotatable shaft sections which are connected by a torque spring and which are adapted to be positioned relative to each other with a predetermined load on said torque spring, means on each spindle assembly for releasably gripping a cap, means for lowering each spindle assembly so as to pick up a cap and position it onto a container, means for rotating each spindle assembly so as to rapidly turn the cap onto the container and tighten the cap with a predetermined torque through rotation of said shaft sections in a direction to increase the load on said torque spring, said shaft sections having adjustably mounted cooperating abutment means which hold said shaft sections against rotation in a direction to relieve the predetermined load on the torque spring, said spindle assemblies being rotated in tightening the caps so that said shaft sections rotate relative to each other in the direction to increase the load on the connecting torque spring and said abutment means limiting the reverse rotation of said shaft sections when said spindle sections are raised free of the turned on caps whereby the caps are seated on the containers with a predetermined torque.

8. A capping machine for applying caps to the threaded mouths of jar-like containers, comprising a turret frame supported for rotation about a vertical axis, said turret frame having a plurality of peripherally spaced, guideway forming bores, a container support having a top platen and a depending hollow stem mounted for limited sliding movement in each of said bores, a compression spring in each of said bores urging the platens upwardly, a cap applying head supported above said turret for rotation on a vertical axis aligned with the vertical axis of the turret, said applying head having a plurality of vertical bores spaced about the periphery thereof which are in vertical alignment with the bores in said turret frame, spindle assemblies mounted for vertical movement in the bores in said head, means for feeding successive containers onto the container supporting platens, means for feeding successive caps to the spindle assemblies, said spindle assemblies each having means for releasably gripping a cap, means for reciprocating the spindle assemblies vertically so as to lower the caps onto the containers, said spindle assemblies each having a friction ring for pressure engagement with a cap, means for lowering said friction ring into engagement with a partially turned on cap against the pressure of said compression spring, means for rotating the spindle assemblies at a high speed to turn the caps partially onto the containers, means to rotate the friction ring at a slow speed to tighten the cap, and means for adjusting the turning force of the friction ring so that the cap is seated onto the container with a predetermined torque.

9. A capping machine for applying caps to the threaded mouths of jar-like containers, comprising a turret supported in an upright position for rotation about a vertical axis, said turrent having a plurality of upwardly urged, container supporting assembles mounted about the periphery thereof, a cap applying head depending from a frame above said turret for rotation on a vertical axis aligned with the vertical axis of the turret, said cap applying head having spindle assemblies spaced about the periphery thereof which are in vertical alignment with said container supporting assemblies, means for feeding successive containers onto the container supporting assemblies, means for feeding successive caps to the spindle assemblies, said spindle assemblies each having means for releasable gripping a cap while placing it on a container and means for frictionally gripping the cap to turn it tight on the container, means for lowering each successive spindle assembly so as to place the cap onto the container, means for rotating each spindle assembly at high speed to turn the cap partially onto the container, and means for rotating portions of each spindle assembly at a relatively low speed so as to turn the cap tight on the container while the spindle assembly is lowered further to apply pressure to the cap and container.

10. A capping machine for applying caps to the threaded mouths of jar-like containers, comprising a turret mounted on an upright frame for rotation about a vertical axis, said turret having a plurality of spring pressed container supporting assemblies mounted about the periphery thereof and container engaging gripper arms adjacent each of said container supporting assemblies, means for delivering containers in upright position onto said supporting assemblies, means for operating the gripper arms to grip the containers, a cap applying head suspended above said turret for rotation on a vertical axis aligned with the axis of rotation of said turrent, said cap applying head having spindle assemblies mounted around its periphery which are spaced in accordance with the spacing of the container supporting assemblies, means for rotating said head and said turret with the spindle assemblies vertically aligned with the container supporting assemblies, said spindle assemblies being vertically movable and having high speed cap applying spindle members and slow speed cap tightening members which cap tightening members are telescoped and mounted for rotation relative to each other about a common vertical axis, a torsion spring connected at its opposite ends to said telescoped members, said telescoped members being rotated to a predetermined relationship so as to preload said torsion spring and cooperating stop members on said telescoped members for limiting the rotation of said telescoped members in the direction to reduce the load on said torsion spring, said high speed spindle members including means on the lower end thereof for releasably holding a cap, means on the lower end of one of said telescoped members for frictionally engaging the top surface of the cap, means for lowering said high speed and low speed members in timed relation to rapidly turn a cap onto a container and thereafter to slowly tighten it, drive means for rotating said members when lowered, and means for adjusting the upward pressure exerted by the container supporting assemblies so as to control the vertical pressure exerted by the cap on the container.

11. A capping machine as recited in claim 10, and each of said container supporting assemblies being mounted in said turret for vertical movement and having a cam roller engaging with a ring cam which is vertically adjustable while the machine is running.

12. A capping machine for applying caps to the threaded mouths of jar-like containers, comprising a turret mounted on an upright frame for rotation about a vertical axis, said turrent having a plurality of container supporting assemblies mounted about the periphery thereof which are urged upwardly by compression springs and container engaging gripper arms adjacent each of said container supporting assemblies, means for delivering containers in upright position onto said supporting assemblies, means for operating the gripper arms to grip the containers, a cap applying head suspended on a frame adjustably mounted above said turret for rotation on a vertical axis aligned with the axis of rotation of said turret, said cap applying head having spindle assemblies mounted around its periphery which are spaced in accordance with the spacing of the container supporting assemblies, means connecting said turret and said head for rotating with the spindle assemblies vertically aligned with the container supporting assemblies, said spindle assemblies being vertically movable and having high speed and slow speed shafts which are rotatable about a common vertical axis, said slow speed shaft including telescoped members which are rotatable relative to each other, a torsion spring connecting said telescoped members, said telescoped members being rotated to a predetermined position to preload said torsion spring, means for limiting the movement of said telescoped members in the direction to unwind said torsion spring while permitting relative rotation thereof in the direction to further wind said torsion spring, a magnet on the lower end of the high speed shaft for releasably holding a cap, a friction ring on the lower end of the inner one of said telescoped members for frictionally engaging the top surface of the cap, means for lowering the high speed shaft and the telescoped members in timed relation, drive means for rotating the high speed and slow speed shafts when they are lowered whereby to spin the cap onto the container, and for slowly tightening the cap on the container with a predetermined torque, and means for individually adjusting the upward pressure exerted by the container supporting assemblies.

13. A capping machine as recited in claim 12, and means for simultaneously adjusting the upward pressure exerted by the container supporting assemblies while the machine is running.

14. In a capping machine for applying caps to the threaded mouths of containers, said machine having a container supporting turret, a cap applying head operative above the container supporting turret, and means for delivering containers and caps to the container supporting turret and the cap applying head, respectively, said container supporting turret being mounted on an upright frame for rotation about a vertical axis and having a supporting frame with a plurality of container supporting assemblies mounted about the periphery thereof, each of said container supporting assemblies having a horizontal platen on which a container is received and a hollow depending stem slidably mounted in a vertical bore in the supporting frame, a compression spring mounted in said stem and having its lower end seated in said bore, and means to adjust the vertical position of the lower end of said spring so as to vary the vertical pressure on the container receiving platen.

15. In a capping machine as recited in claim 14, and means for limiting the upward movement of said hollow stem in said bore.

16. In a capping machine as recited in claim 14, and each said container supporting assembly having a cam follower mounted thereon, a cam ring on said supporting frame engaged by said cam follower, and means for adjusting the height of said cam ring so as to simultaneously adjust the spring pressure of all the container supporting assemblies.

17. In a capping machine as recited in claim 16, and a gauge connected to said cam ring adjusting means for indicating the pressure exerted by the springs.

18. In a capping machine for applying caps to the threaded mouths of containers, a turret rotatably supported on an upright frame for rotation about a vertical axis, said turret having a supporting frame with a plurality of vertically disposed, peripherally spaced bores, container supporting assemblies slidably mounted in said bores, each of said container supporting assemblies having a horizontal container receiving top plate with a hollow depending stem which is slidably seated in a bore in the supporting frame, a compression spring mounted in said stem with the lower end seated on a headed pin which is slidably mounted in said bore and a set screw for adjusting the vertical position of said headed pin.

19. In a capping machine for applying caps to the threaded mouths of containers, a turret supported on an upright frame for rotation about a vertical axis, said turret having a plurality of container supporting platens mounted in spaced relation about its periphery, a pair of container gripping arms for holding a container in fixed position on each of said platens, one of said arms being mounted in fixed relation at one side of the container supporting platen, the other one of said arms being mounted on a vertical pivot shaft at the other side of the container supporting platen, an operating arm on said pivot shaft and a spring urging said arm in the direction to close the gripping arm on the container, a cam arm on said pivot shaft having a cam roller thereon, and a cam on said frame for engaging said cam roller at predetermined points to open said gripping arm and release the container.

20. A machine for applying caps to jar-like containers, comprising an infeed conveyor having pockets for successive containers to be capped and advancing along a straight line path to a container and cap assembly station, a cap supply means and means for advancing successive caps to said assembly station, a supporting conveyor mounted at one side of the straight line path of said infeed conveyor and carrying a plurality of container supporting platforms in a circular path which intersects the straight line path of the infeed conveyor at two spaced points, the containers being delivered to the supporting platforms and being advanced by the straight line conveyor along a chordal path relative to the circular path of the supporting platforms, pairs of gripper arms adjacent each of said platforms for gripping the containers, a resilient plate member positioned with respect to the gripper arms of each pair thereof for engaging a container to hold the container in its straight line path in its pocket on the infeed conveyor as the container is positioned on a platform for cap application, and means to close the gripper arms on the container after the container has been delivered onto the platform at the container and cap assembly station, and a cap has been applied thereto, so as to withdraw the capped container from the infeed conveyor pocket and hold the same on the platform for further tightening of the cap.

21. A machine for applying caps to jar-like containers, comprising an infeed conveyor for advancing successive containers to be capped along a straight line path to a container and cap assembly station, a cap supply means and means for advancing successive caps to said assembly station, a supporting conveyor mounted at one side of the straight line path of said infeed conveyor and carrying a plurality of container supporting platforms in a circular path which intersects the straight line path of the infeed conveyor at two spaced points, the containers being delivered to the supporting platforms and being advanced by the straight line conveyor along a chordal path relative to the circular path of the supporting platforms, means on the platforms for gripping the containers on the platforms so as to withdraw them from the infeed conveyor, a capping head mounted for rotation above said supporting conveyor, said capping head having a plurality of spindle assemblies spaced around the periphery thereof which travel in a path in vertical alignment with the circular path of the containers on the supporting conveyor for placing a cap on each successive container, each said spindle assembly having axially aligned cap applying and cap tightening spindle shafts which are mounted for movement in a vertical direction relative to each other, the cap applying shaft having a member on the lower end with means for holding thereon a cap delivered to said assembly station, the cap tightening shaft having a friction ring on the lower end for engaging the cap, cam means for raising and lowering the cap applying and cap tightening shafts in timed relation to the movement of the containers, drive means for imparting high speed rotation to the cap applying shaft and drive means for imparting slow speed rotation to the cap tightening shaft in timed relation to the movement of the containers to first position a cap on a container and rapidly turn it down while the container moves in a straight line along said chordal path and thereafter turn said cap tight on the top of said container while the container advances in a circular path.

22. A capping machine for applying caps to the threaded mouths of jar-like containers, comprising a turret mounted for rotation about a vertical axis, said turret having a plurality of spring pressed container supporting assemblies mounted about the periphery thereof and container gripping means mounted on each of said container supporting assemblies, means for delivering containers in upright position onto said supporting assemblies, a cap applying head suspended above said turret for rotation on a vertical axis aligned with the axis of rotation of said turret, said cap applying head having mounted thereon spindle assemblies which are spaced in accordance with the spacing of the container supporting assemblies, means for rotating said head and said turret with the spindle assemblies vertically aligned with containers on said supporting assemblies, said spindle assemblies being vertically movable and having telescoped shaft members which are rotatable relative to each other about a common vertical axis, one of said shaft members having a torsion producing means connecting two relatively rotatable shaft sections, means on the lower end of one of said shaft members for releasably holding a cap, means on the lower end of one of said shaft sections for frictionally engaging the top surface of the cap, means for lowering the shaft members in timed relation to place a cap on a container and turn it tight, drive means for rotating the cap holding shaft member at a relatively high speed when it is lowered, so as to rapidly spin the cap held thereon onto the container, drive means for rotating the shaft having the torsion producing means at a relatively slow speed when it is lowered for slowly tightening the cap on the container with a predetermined torque.

23. A capping machine as recited in claim 22, and each of said container supporting assemblies having means for adjusting its spring pressure.

24. A capping machine for turning caps onto the mouths of jar-like containers, comprising a turret mounted for rotation about a vertical axis and having a plurality of container supports mounted in circumferentially spaced relation thereon, container grippers at each of said container supports, means for delivering containers in upright position onto said supports at one side of said turret, means for operating the grippers to grip the containers when they are delivered onto said supports and to release the containers at the other side of said turret, a cap applying head suspended above said turret for rotation on a vertical axis and having cap applying and cap turning spindles mounted thereon which are spaced in accordance with the spacing of the container supports on the turret, means for rotating said head and said turret with the spindles vertically aligned with the container supports, means for supplying caps to said cap applying spindles, means for operating the cap applying and cap turning spindles to place a cap on a container and thereafter to turn it tight while the container is carrier on said turret, and a discharge wheel at the other side of said turret having pockets for receiving the capped containers when they are released by said grippers.

25. A capping machine as recited in claim 24, and means including a guide member for moving the capped containers from the supports on the turret into the pockets of the discharge wheel.

26. A machine for applying caps to jar-like containers, comprising an infeed conveyor having pockets for releasably holding containers therein for advance to a container and cap assembly station along a straight line path, cap feeding means for advancing successive caps to said assembly station, a turret disposed at one side of said infeed conveyor and having a plurality of container supports traveling in a circular path which intersects the path of the infeed conveyor at two spaced points, the containers being delivered to the supports while they are advanced by the infeed conveyor along a chordal path relative to the path of the supports, means on the turret operable for gripping and holding the containers on the supports, a capping head mounted for rotation above said turret and having a plurality of spindles spaced thereon in vertical alignment with the container supports for receiving the caps and placing a cap on each successive container, and means for operating the container grippers to grip the containers and remove the same from the infeed conveyor pockets while the containers are advanced along said chordal path.

27. A machine for applying caps to jar-like containers, comprising an infeed conveyor for advancing successive containers to a container and cap assembly station, cap feeding means for advancing successive caps to said assembly station, a turret conveyor mounted on a supporting frame at one side of said infeed conveyor and carrying a plurality of individual container supporting platforms, a rotatable capping head suspended from an overhead frame which is mounted on said turret supporting frame by vertical posts each having telescoping members connected to the overhead frame and said turret supporting frame, said capping head being mounted for rotation above said turret and on an axis coinciding with the axis of rotation of said turret, said capping head having a plurality of cap applying and turning spindles spaced around the periphery thereof in vertical alignment with the container supporting platforms for placing a cap on each successive container while it rotates on said turret, and means for raising and lowering the spindles to engage the cap, each container supporting platform being individually mounted in vertical sliding relation on said turret and seated on a compression spring, each compression spring having means for adjusting its height so as to vary the pressure exerted by a spindle on a cap when the spindle is lowered into engagement with the cap, vertically spaced brackets on the telescoping members of one of said vertical posts, one of said brackets having a gauge member detachably mounted thereon with means for supporting a container of predetermined height between said brackets so that the capping head may be raised or lowered initially to the proper height to accommodate the container placed on the gauge.

28. A machine as recited in claim 27, and said gauge member having a compression spring therein and a gauge ring whereby the gauge member may be detached from its bracket and placed successively on each container supporting platform on the turret to enable the platform compression springs to be adjusted so that predetermined uniform pressure will be applied at all the platforms between the spindle and the cap when the spindle is lowered to engage the cap.

29. A capping machine for turning caps onto the mouths of jar-like containers, comprising a turret mounted for rotation about a vertical axis and having a plurality of container supports mounted in circumferentially spaced relation thereon, container grippers at each of said container supports means for delivering containers in upright position onto said supports at one side of said turret, means for operating the grippers to grip the containers when they are delivered onto said supports and to release the containers at the other side of said turret, a cap applying head suspended above said turret for rotation on a vertical axis and having cap applying and cap turning spindles mounted thereon which are spaced in accordance with the spacing of the container supports on the turret, means for rotating said head and said turret with the spindles vertically aligned with the container supports, means for supplying caps to said cap applying spindles, means for operating the cap applying and cap turning spindles to place a cap on a container and thereafter to turn it tight while the container is carried on said turret, a discharge wheel at the other side of said turret having pockets for receiving the capped containers when they are released by said grippers, and a device for removing unused caps from the cap applying and turning spindles which comprises a chute mounted adjacent the discharge wheel and having an arm at its mouth which extends into the path of unused caps on the spindles for wiping the caps off the spindles and into the mouth of the chute.

30. A capping machine as recited in claim 29, and said chute being of inverted U-shape with magnets mounted therein for releasably holding the caps in the chute.

References Cited by the Examiner

UNITED STATES PATENTS

| 2,338,852 | 1/1944 | Hohl et al. | 53—302 |
| 2,765,608 | 10/1956 | Ford et al. | 53—339 |
| 3,031,822 | 5/1962 | Dimond | 53—317 |
| 3,040,492 | 6/1962 | Stover et al. | 53—331.5 X |
| 3,100,366 | 8/1963 | Gordon | 53—317 |

TRAVIS S. McGEHEE, *Primary Examiner.*

A. E. FOURNIER, *Assistant Examiner.*